(12) United States Patent (10) Patent No.: US 8,434,390 B2
Cross et al. (45) Date of Patent: May 7, 2013

(54) FLEXIBLE THREADING SYSTEM

(75) Inventors: Brandon Seth Cross, Atlanta, GA (US); Matthew Steven Larson, Cornelius, NC (US); Derek James Nash, Huntersville, NC (US); James Joseph Uttley, Huntersville, NC (US); Ronald A. Wenzel, Jr., Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 924 days.

(21) Appl. No.: 12/547,873

(22) Filed: Aug. 26, 2009

(65) Prior Publication Data

US 2009/0308209 A1 Dec. 17, 2009

Related U.S. Application Data

(63) Continuation-in-part of application No. 11/742,836, filed on May 1, 2007, now Pat. No. 7,793,569.

(51) Int. Cl.
*B25B 13/46* (2006.01)

(52) U.S. Cl.
USPC .................................. 81/63.1; 81/60; 81/63.2

(58) Field of Classification Search ............. 81/60, 63.1, 81/63.2
See application file for complete search history.

(56) References Cited

U.S. PATENT DOCUMENTS

| | | | |
|---|---|---|---|
| 2,701,977 A | 2/1955 | Stone | |
| 3,572,188 A | 3/1971 | Christian, Jr. | |
| 3,738,768 A * | 6/1973 | Kuhn | 408/240 |
| 4,065,987 A | 1/1978 | Rager | |
| 4,095,917 A * | 6/1978 | Wesner | 408/239 R |
| 4,752,163 A * | 6/1988 | Fedor | 408/123 |
| 4,752,163 B1 | 6/1988 | Fedor | |
| 4,799,832 A | 1/1989 | Abbott | |
| 5,069,091 A | 12/1991 | Bramsiepe et al. | |
| 5,299,895 A * | 4/1994 | Greenhill | 408/56 |
| 5,481,947 A | 1/1996 | Banns | |
| D385,172 S | 10/1997 | Bramsiepe et al. | |
| 5,765,669 A | 6/1998 | Adams et al. | |
| D419,298 S | 1/2000 | Bramsiepe et al. | |
| 6,050,165 B1 | 4/2000 | Hall | |

(Continued)

OTHER PUBLICATIONS

Intellectual Property Office, Examination Report, Oct. 31, 2011, GB0804620.3.

(Continued)

*Primary Examiner* — Lee D Wilson
*Assistant Examiner* — Shantese McDonald
(74) *Attorney, Agent, or Firm* — Dennis J. Williamson; Moore & Van Allen PLLC

(57) ABSTRACT

A wrench has a socket defined by a plurality of flat faces and a handle. A first threading tool is provided having a shape and dimension to fit into the socket. An adapter that retains a second threading tool includes a connector having the same shape and the dimension as the first threading tool that fits into the socket. A retaining member is rotatably mounted to the body for movement between a first position and a second position for locking the adapter and the die in the socket. The retaining member has a second plurality of flat faces defining an opening where the second plurality of faces are coextensive with the faces of the socket when the retaining member is in the first position and are offset from the faces of the socket when the retaining member is in the second position.

30 Claims, 34 Drawing Sheets

U.S. PATENT DOCUMENTS

| | | | |
|---|---|---|---|
| 6,058,812 | A | 5/2000 | Casel et al. |
| 6,186,785 | B1 | 2/2001 | Rogers et al. |
| 6,216,563 | B1 | 4/2001 | Hsieh |
| 6,575,059 | B2 | 6/2003 | Liu |
| 6,641,145 | B1 | 11/2003 | Nebe et al. |
| 6,851,339 | B2 | 2/2005 | Casel |
| 6,857,339 | B2 | 2/2005 | Chen |
| 7,114,824 | B2 | 10/2006 | Picone |
| 7,117,765 | B1 * | 10/2006 | Wallden ............................ 81/60 |
| 7,124,664 | B1 | 10/2006 | Lee |
| 7,793,569 | B2 | 9/2010 | Nash et al. |
| 2003/0037642 | A1 * | 2/2003 | Liu .................................. 81/60 |

OTHER PUBLICATIONS

Irwin Industrial Tool Company, U.S. Appl. No. 11/742,836, Office Action dated Feb. 15, 2008.

Irwin Industrial Tool Company, U.S. Appl. No. 11/742,836, Office Action dated Aug. 20, 2008.

Irwin Industrial Tool Company, U.S. Appl. No. 11/742,836, Final Office Action dated Apr. 30, 2009.

Irwin Industrial Tool Company, U.S. Appl. No. 11/742,836, Office Action dated Jul. 16, 2009.

* cited by examiner

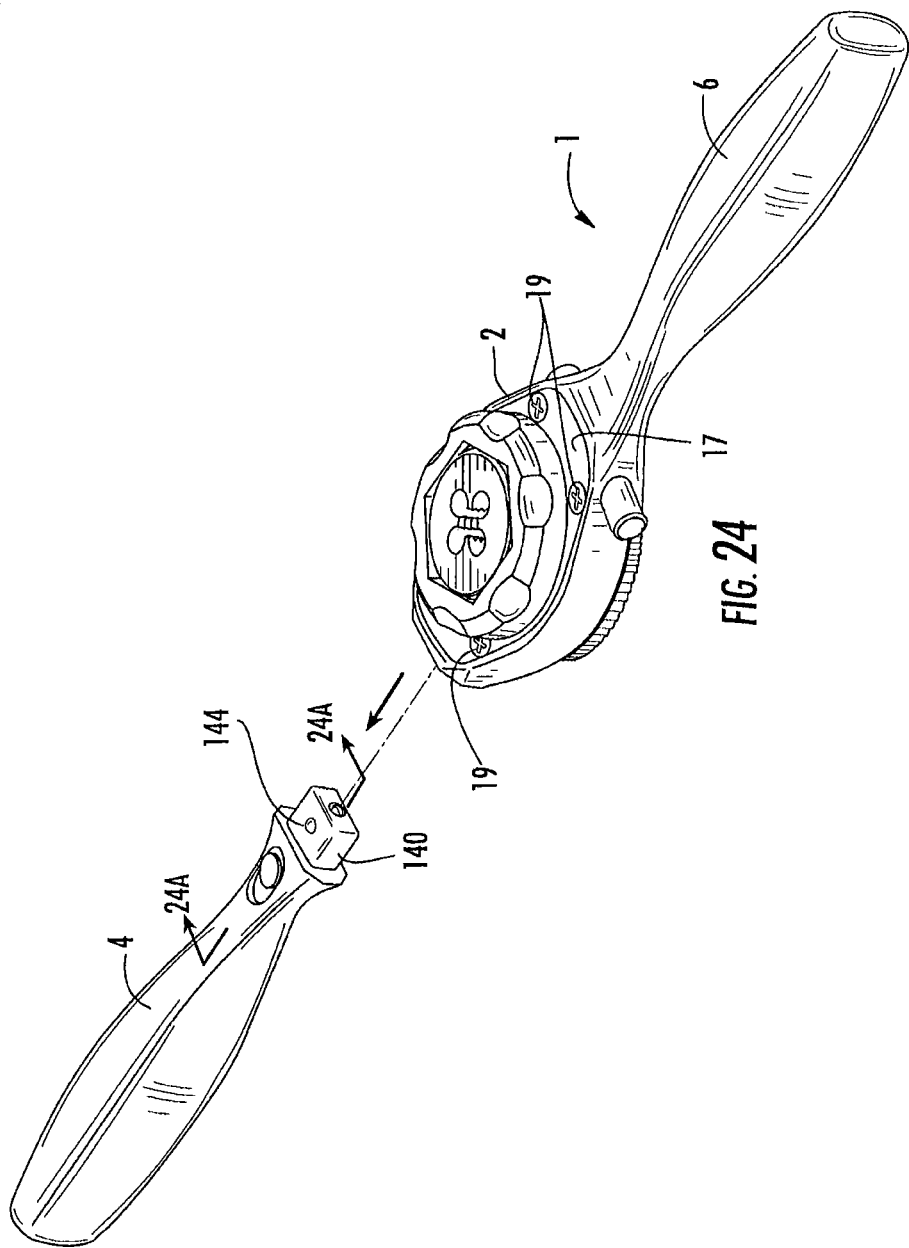

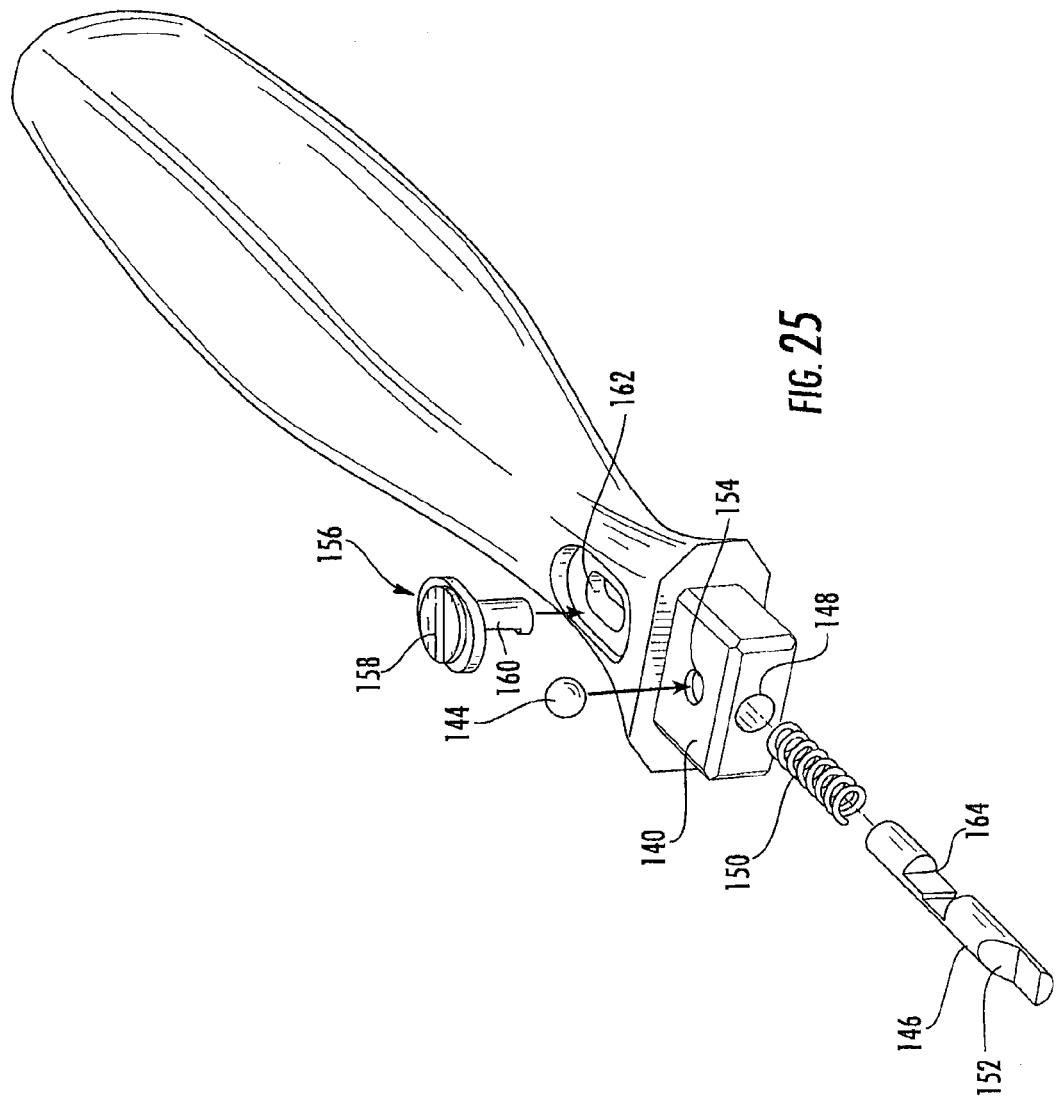

US 8,434,390 B2

FLEXIBLE THREADING SYSTEM

This application is a continuation-in-part of prior application Ser. No. 11/742,836, filed May 1, 2007.

FIELD OF THE INVENTION

The invention relates generally to wrenches and threading systems and, more particularly, to an improved tap and die threading system.

BACKGROUND OF THE INVENTION

It will be appreciated that many different types of wrenches are known including die wrenches and ratcheting wrenches. Die wrenches typically comprise a socket for receiving a threaded die. Threaded dies are known for cutting or repairing and cleaning threads in a stud. These devices may be used to cut threads into virgin unthreaded stock or may be used to clean out and repair damaged, dirty or rusted threads in a threaded stud. The socket of the die wrench typically includes a set screw that can be rotated into engagement with the die to retain the die in the socket. Handles extend from the socket and are offset from one another 180 degrees such that both handles may be gripped to apply a uniform turning force on the die and maintain the proper orientation of the die relative to the stud. The socket may ratchet relative to the handles.

Ratchet wrenches are known where a tool is ratcheted to a handle such that the wrench can tighten or loosen a fastener without removing the wrench from the fastener. Ratchet wrenches may be embodied in combination with a socket wrench where the sockets are removably attached to the ratchet handle. These types of wrenches make the operation of the wrench less cumbersome in certain applications because the wrench does not have to be removed from the fastener for multiple turns. A set of wrenches or sockets is typically required in order for the wrench to be used on different size fasteners.

SUMMARY OF THE INVENTION

One embodiment of the flexible threading system comprises a wrench with a body having a socket defined by a plurality of flat faces. A handle is connected to the body for rotating the body. A retaining member is rotatably mounted to the body for movement between a first position and a second position. The retaining member has a second plurality of flat faces defining an opening where the second plurality of faces are coextensive with the plurality of faces of the socket when the retaining member is in the first position. The retaining member exposes the socket when in the first position and has a portion extending over the socket when in the second position. A first threading tool, such as a die, is provided having a shape and a dimension to fit into the socket. An adapter including a connector having the same shape and dimension as the first threading tool also fits into the socket. The adapter releasably retains a tap.

A flexible threading method is also provided that comprises selecting one of a plurality of dies or one of a plurality of taps. If one of the plurality of dies is selected, the die is inserted into the socket when the retaining member is in the first position. The retaining member is rotated to the second position. If one of the plurality of taps is selected, the adapter is inserted into the socket when the retaining member is in the first position, and the retaining member is then rotated to the second position. A selected tap is inserted into the adapter.

A method of providing a flexible threading system is also provided that provides a wrench having a body having a socket defined by a plurality of flat faces, a handle connected to the body for rotating the body, and a retaining member rotatably mounted to said body for movement between a first position and a second position. A first set of a plurality of dies is provided where each die has a shape and a dimension to fit into the socket. A second set of a plurality of taps is also provided. An adapter is provided for retaining one of the plurality of taps that has a connector with the same shape and the dimension to fit into said pocket.

An adapter comprises a first connector having a hexagonal shape connected to a body portion such that a shoulder is formed between the body portion and the first connector. The shoulder is chamfered. A tool engaging portion on the body portion releasably retains a tool and includes a plurality of teeth that are movable into engagement with the tool. A second connector is provided for connecting to the drive of a standard ratchet wrench comprising a recess, such as a square recess, formed along a rotational axis of the adapter. A third connector is provided comprising a bore formed transverse to the rotational axis of the adapter. The teeth are biased away from one another and are forced toward one another by a sleeve that is movable from a release position to a locked position.

BRIEF DESCRIPTION OF THE DRAWINGS

FIG. 24 is a perspective view of the wrench with one handle removed.

FIG. 25 is an exploded perspective view of the removable handle.

DETAILED DESCRIPTION OF EMBODIMENTS OF THE INVENTION

Figure 1:
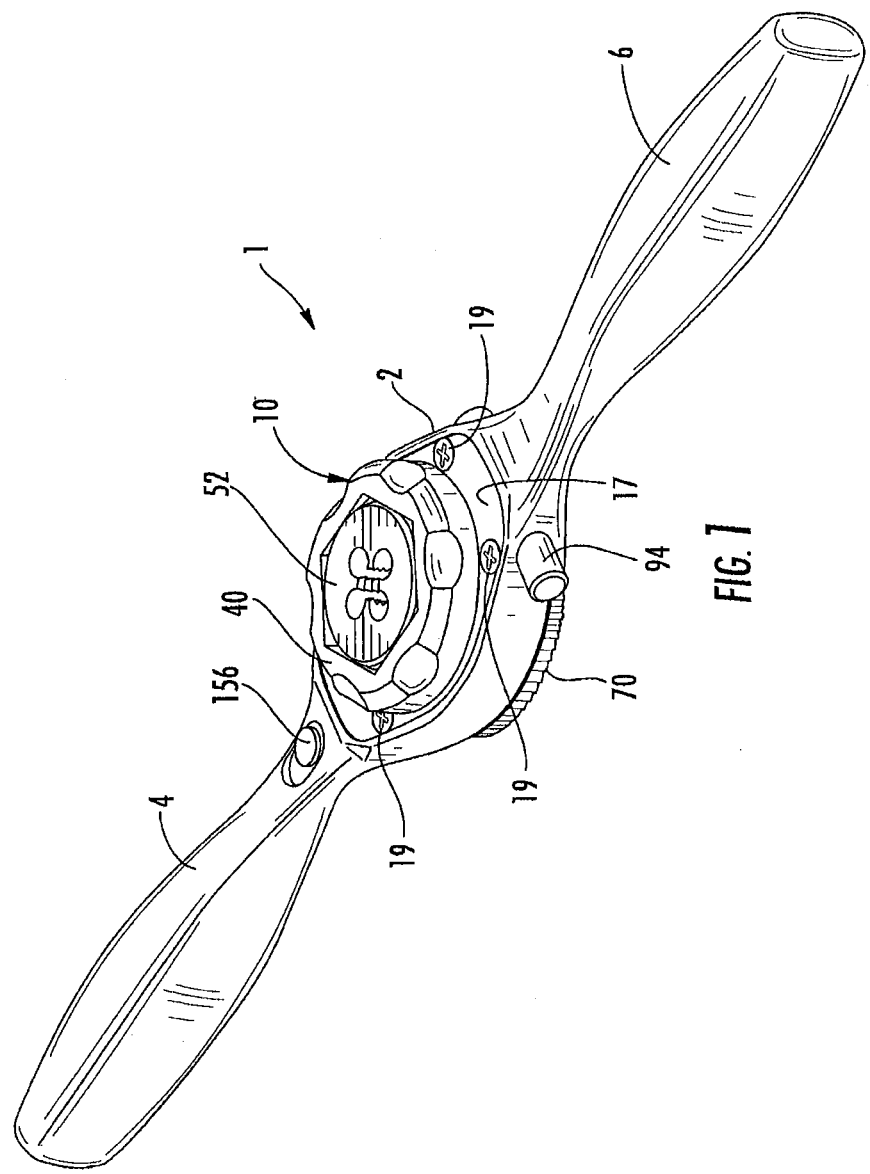
FIG. 1 is a perspective top view of one embodiment of the wrench of the invention.
Figure 2:
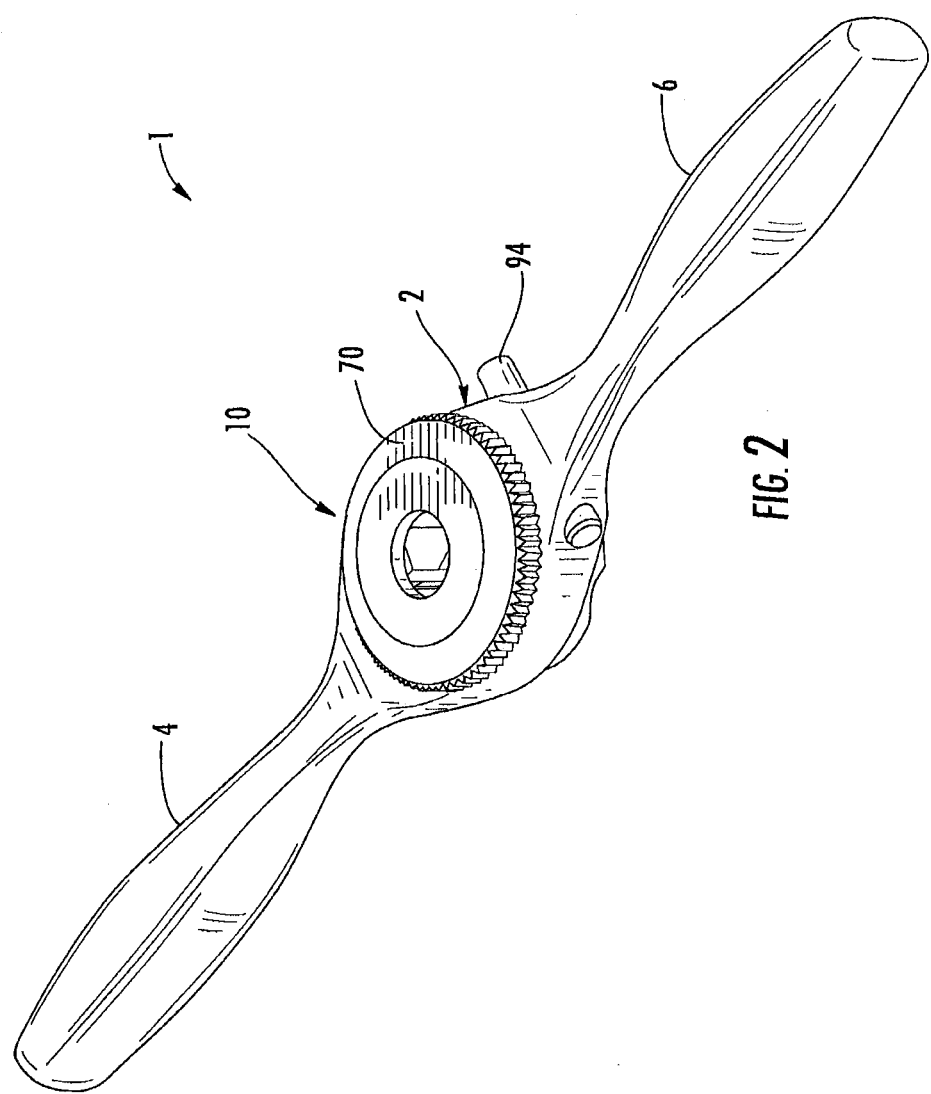
FIG. 2 is a perspective bottom view of the embodiment of FIG. 1 with a die positioned in the wrench.

An embodiment of the wrench of the invention is shown generally at 1 in the Figures and includes a wrench housing 2 connected to two handles 4 and 6. Handles 4 and 6 are offset from one another approximately 180 degrees such that the handles extend along the longitudinal axis of the wrench. Handle 4 may be made removable from the housing portion 2 as will hereinafter be described. The housing 2 defines a cavity 8 (FIG. 20) that extends through the housing portion and receives a wrench assembly 10.

Figure 3:
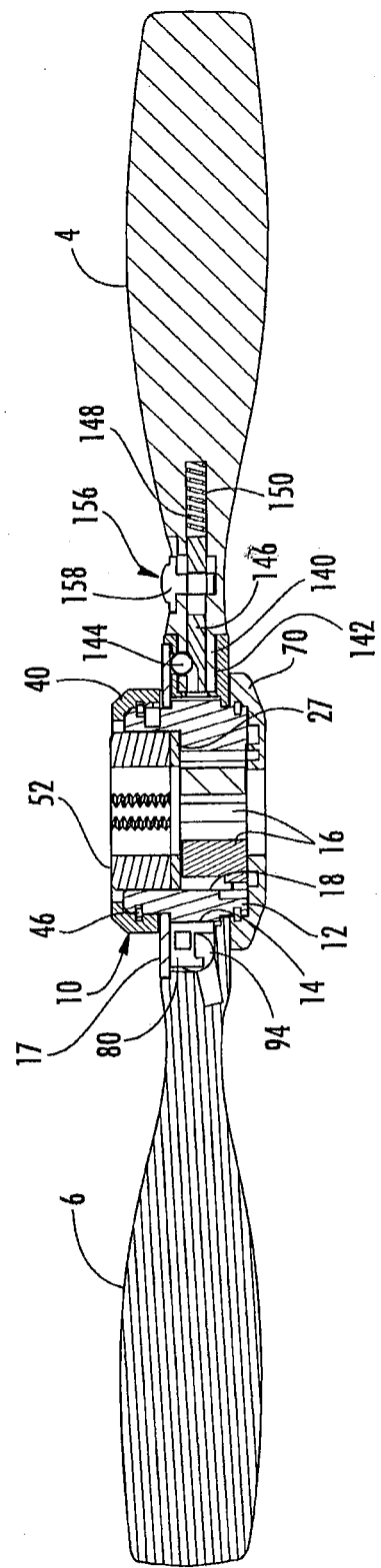
FIG. 3 is a longitudinal section view of the embodiment of FIG. 1.
Figure 4:
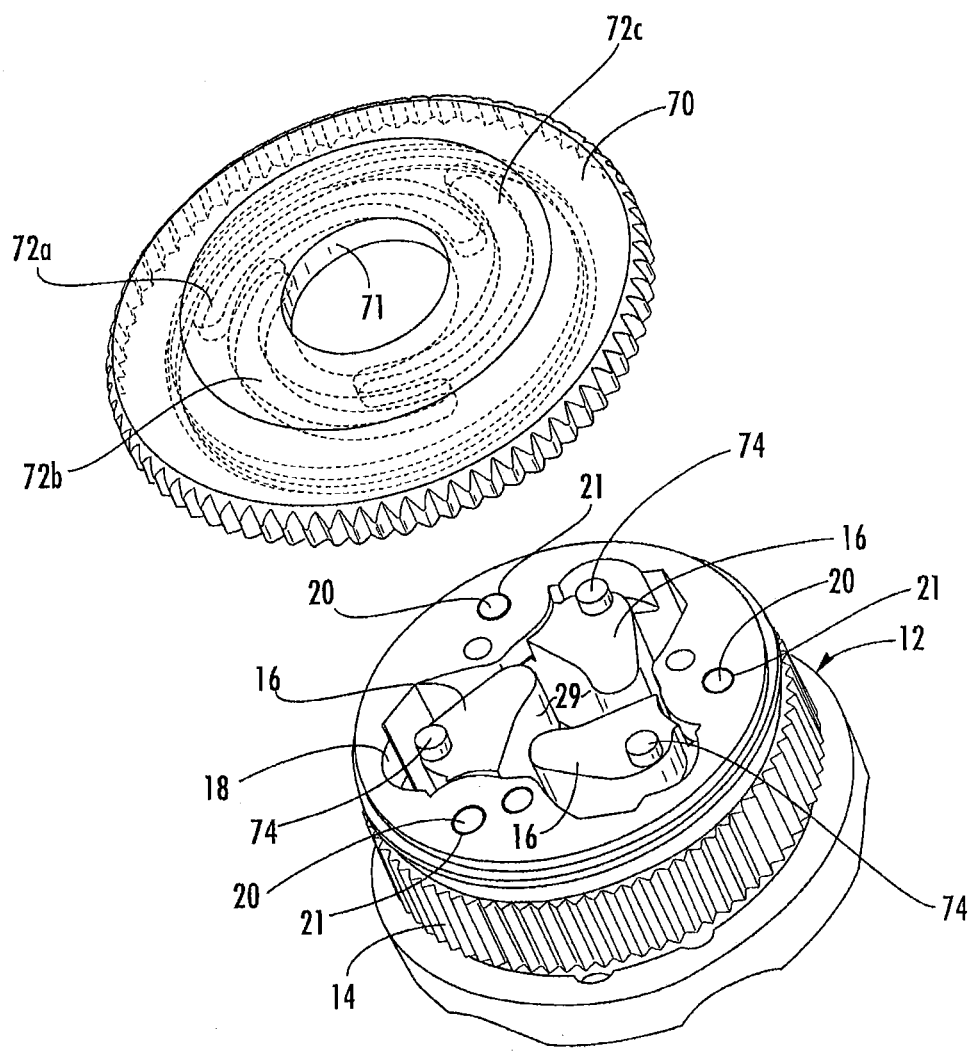
FIG. 4 is an exploded perspective bottom view of the wrench assembly of the embodiment of FIG. 1.
Figure 5:
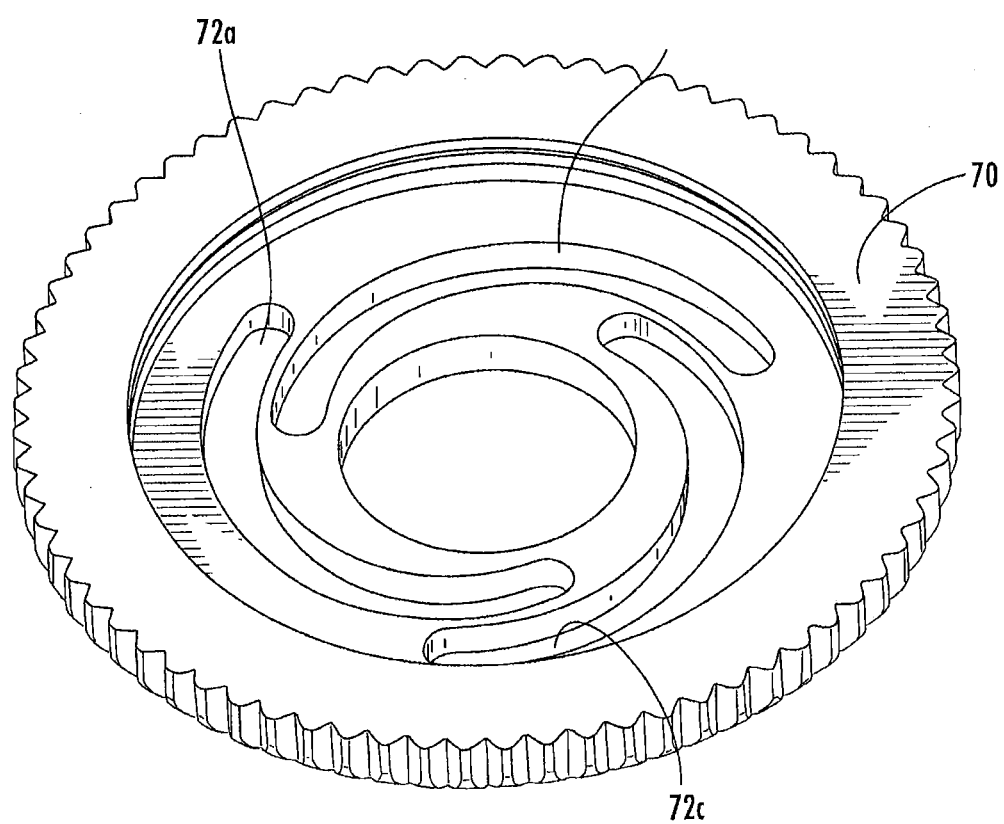
FIG. 5 is a perspective view of the cam plate shown in FIG. 4.
Figure 6:
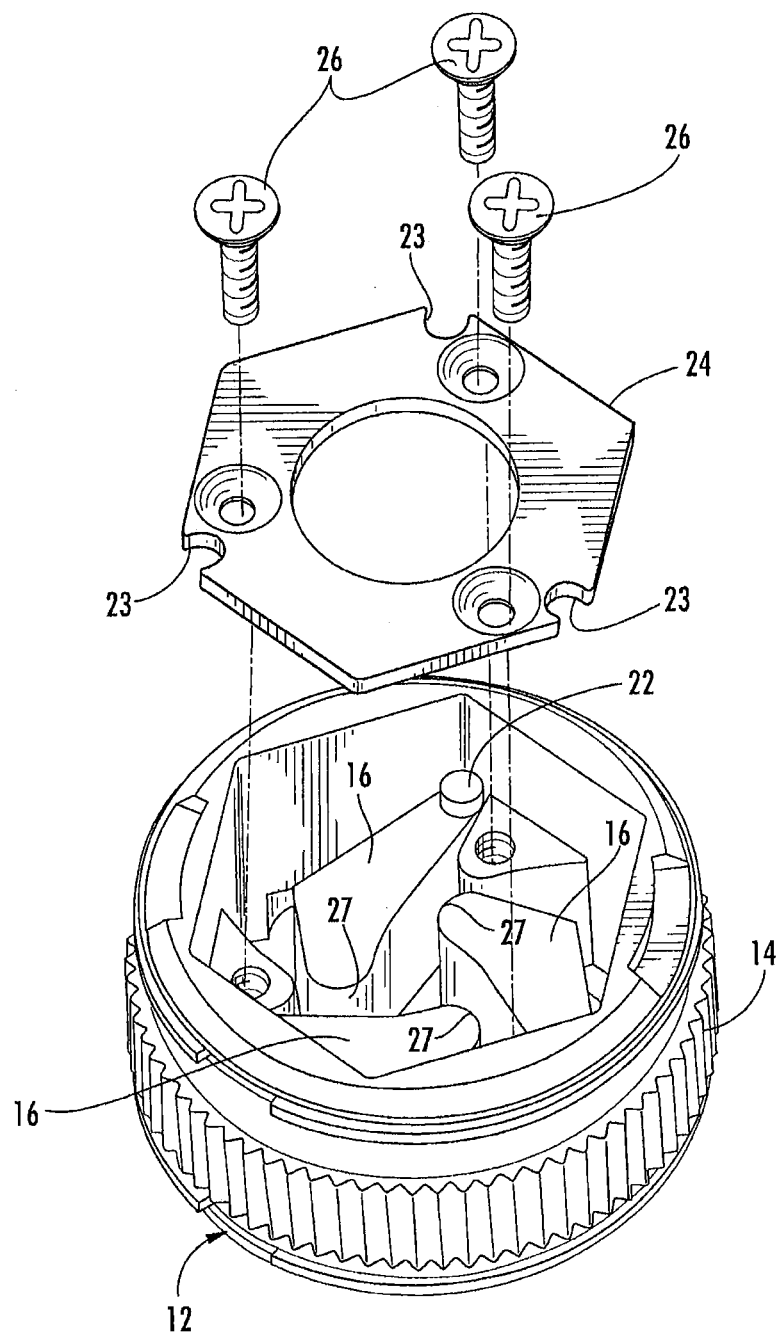
FIG. 6 is an exploded perspective top view of the wrench assembly of the embodiment of FIG. 1.
Figure 9:
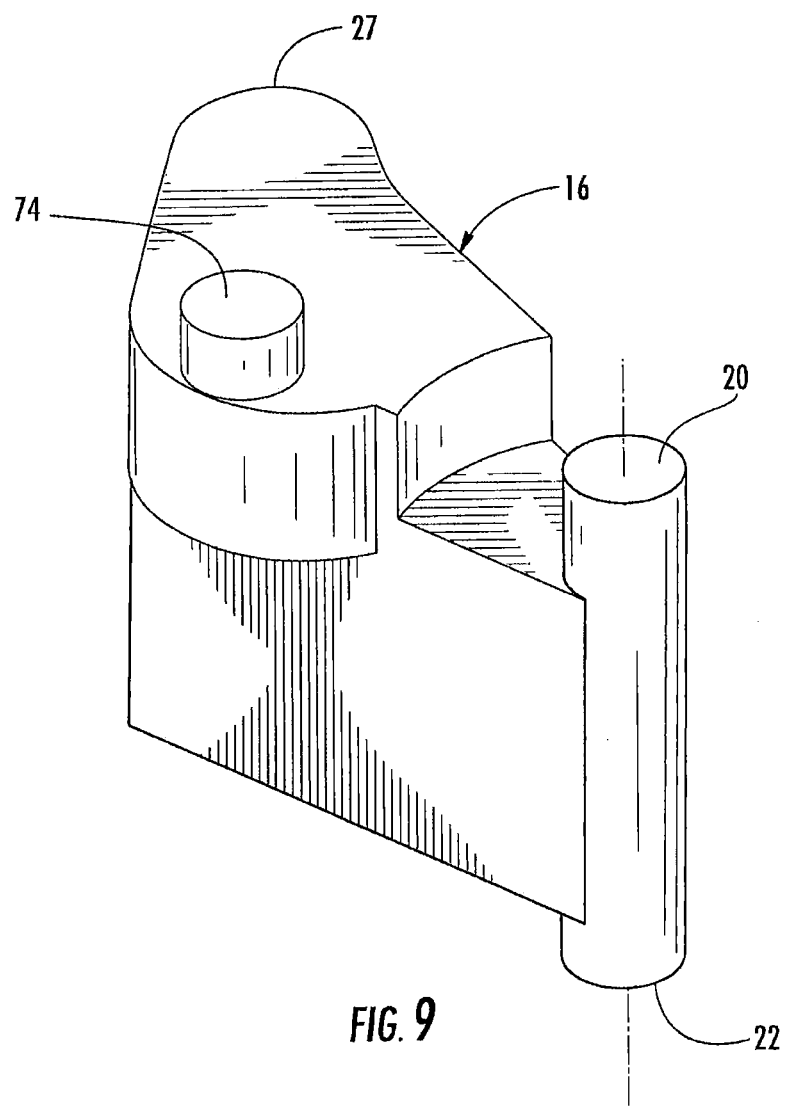
FIG. 9 is a perspective view of the alignment guide of the wrench assembly.

Referring to FIGS. 3 and 4, wrench assembly 10 comprises an annular body 12 having ratchet teeth 14 formed in a ring around the outer periphery thereof that are selectively engaged by pawls 80 and 82 to effectuate the ratcheting movement of the wrench as will hereinafter be described. A plurality of guides 16 are located in the interior cavity 18 of annular body 12. Each of the guides 16 include a pair of opposed pins 20 and 22 that form a hinge about which the guide pivots (FIG. 9). Pins 20 engage hole 21 formed in the annular body 12 (FIG. 4) while the other of the pins 22 are retained in recesses 23 formed in cover plate 24 (FIG. 6). Cover plate 24 may be secured to annular body 12 by any suitable fastening mechanism such as screws 26 to retain the guides 16 in the annular body 12. Each of the guides 16 include a distal end 27 that engages the stud on which the wrench is used to maintain the orientation of the wrench relative to the stud as will hereinafter be described.

Figure 7:
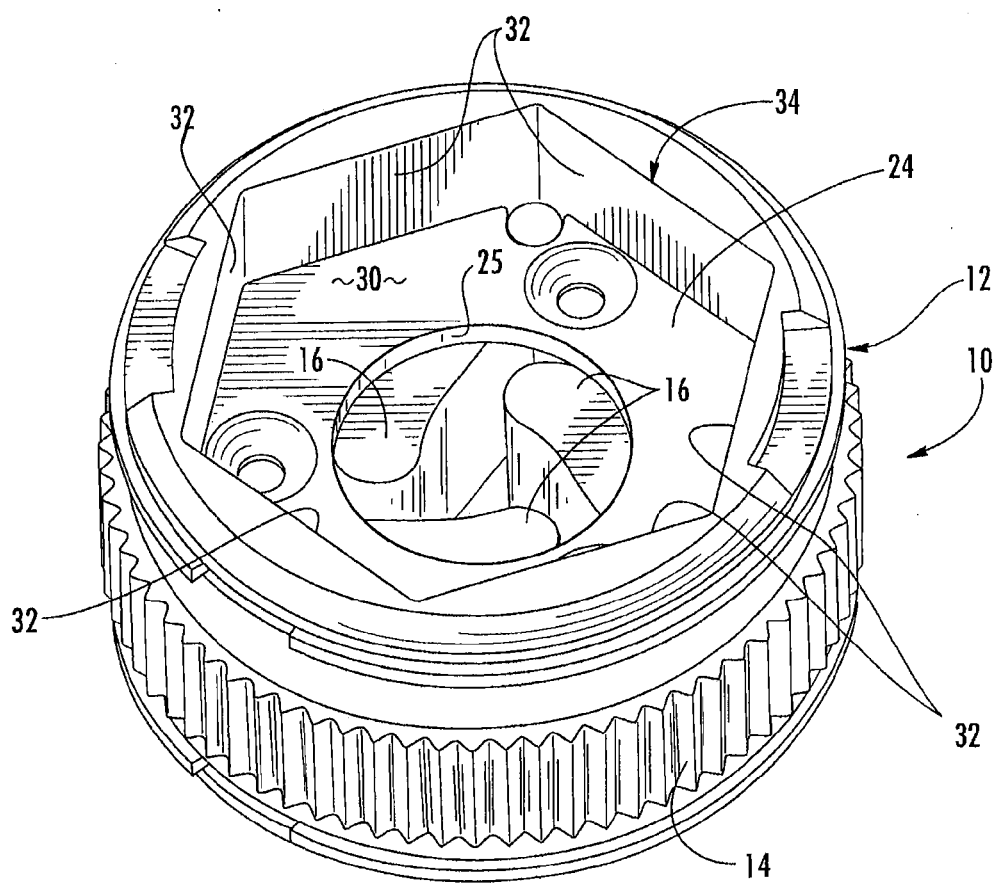
FIG. 7 is a perspective top view of the wrench assembly of the embodiment of FIG. 1.
Figure 8:
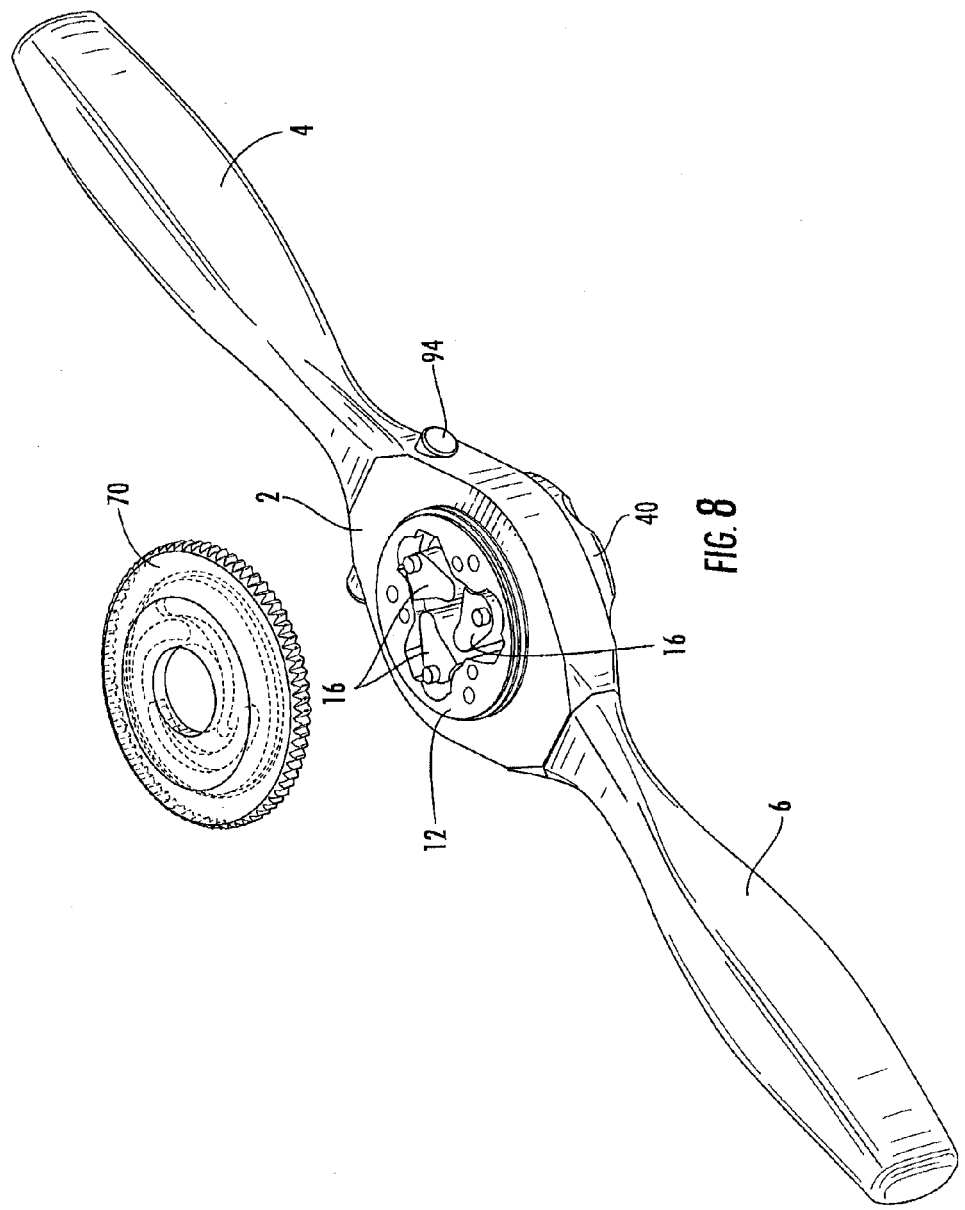
FIG. 8 is a partially exploded perspective bottom view of the wrench of FIG. 1.

Referring to FIG. 7, the cover plate 24 also serves to define a second interior cavity 30 in annular body 12 that is separated from cavity 18 by plate 24. The plate 24 includes a centrally located through hole 25 that communicates cavity 30 with cavity 18. The periphery of the second interior cavity 30 is defined by a plurality of flat faces 32 arranged to create a socket 34 that receives a die or other tool. The flat faces 32 engage the flat faces of the die or other tool such that the die or other tool is prevented from rotating relative to the annular body 12.

The wrench assembly 10 is located in cavity 8 such that the socket 34 is exposed on one side of the wrench (FIG. 10) and the guides 16 are disposed towards the opposite side of the wrench. The wrench assembly 10 is maintained in cavity 8 by plate 17 that is secured to housing 2 by fasteners 19 such as screws. Referring to FIGS. 3 and 10 through 14, a retainer in the form of a retaining ring 40 is located on the annular body 12 such that it extends around the periphery of body 12 and rotates relative to the body. The retaining ring 40 may be connected to the annular body 12 by a compression ring 46 that expands into annular recesses 42 and 44 formed on the body 12 and retaining ring 40, respectively. The retaining ring 40 is formed with an opening 48 that has a periphery defined by faces 48a that are substantially coextensive with the faces 32 of socket 34. The opening 48 is defined by a laterally extending flange 50 that extends toward the interior of the retaining ring to secure a die or other tool in the socket 34.

Figure 10:
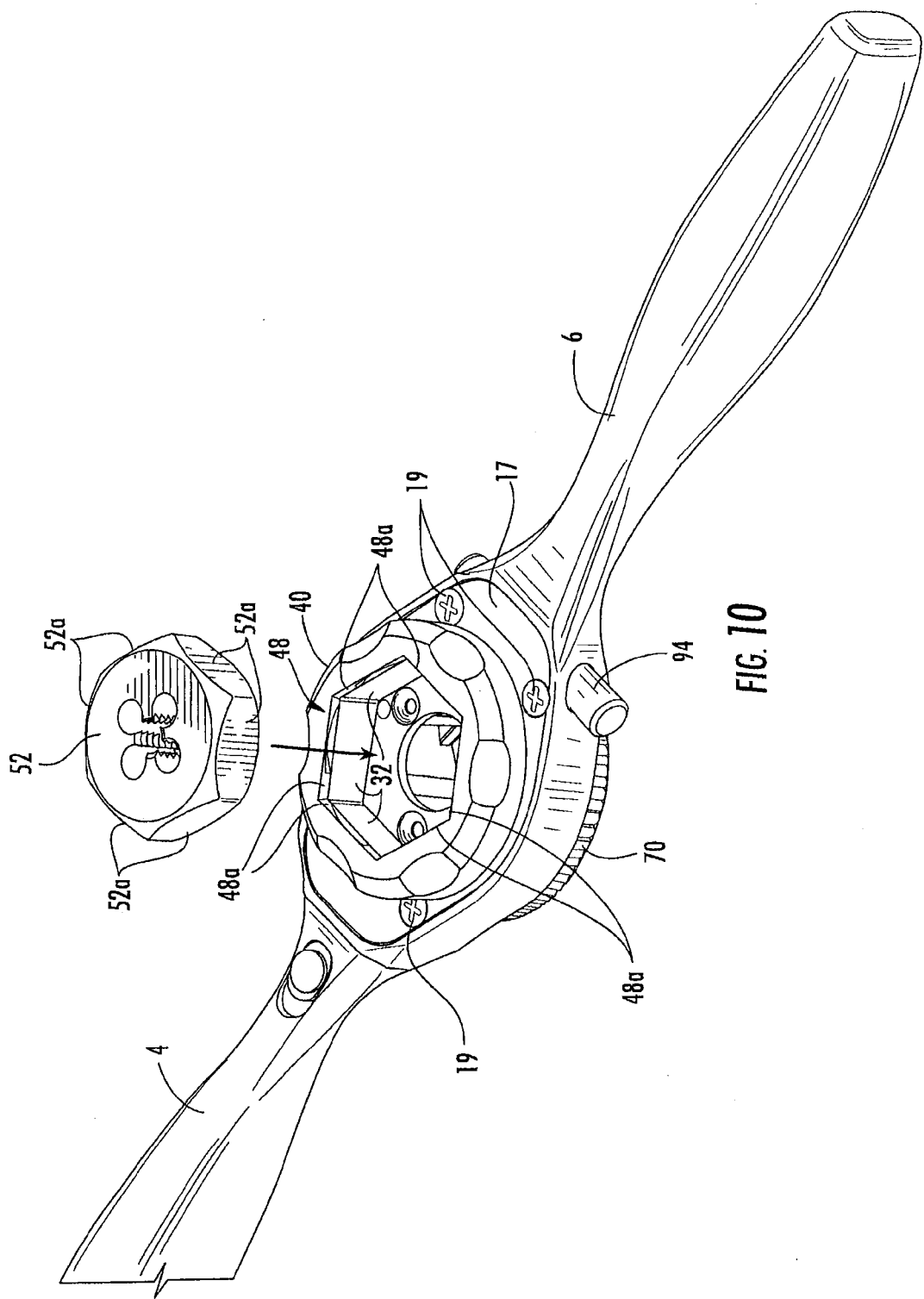
FIG. 10 is a perspective top view of the embodiment of FIG. 1 with the die removed from the wrench.
Figure 11:
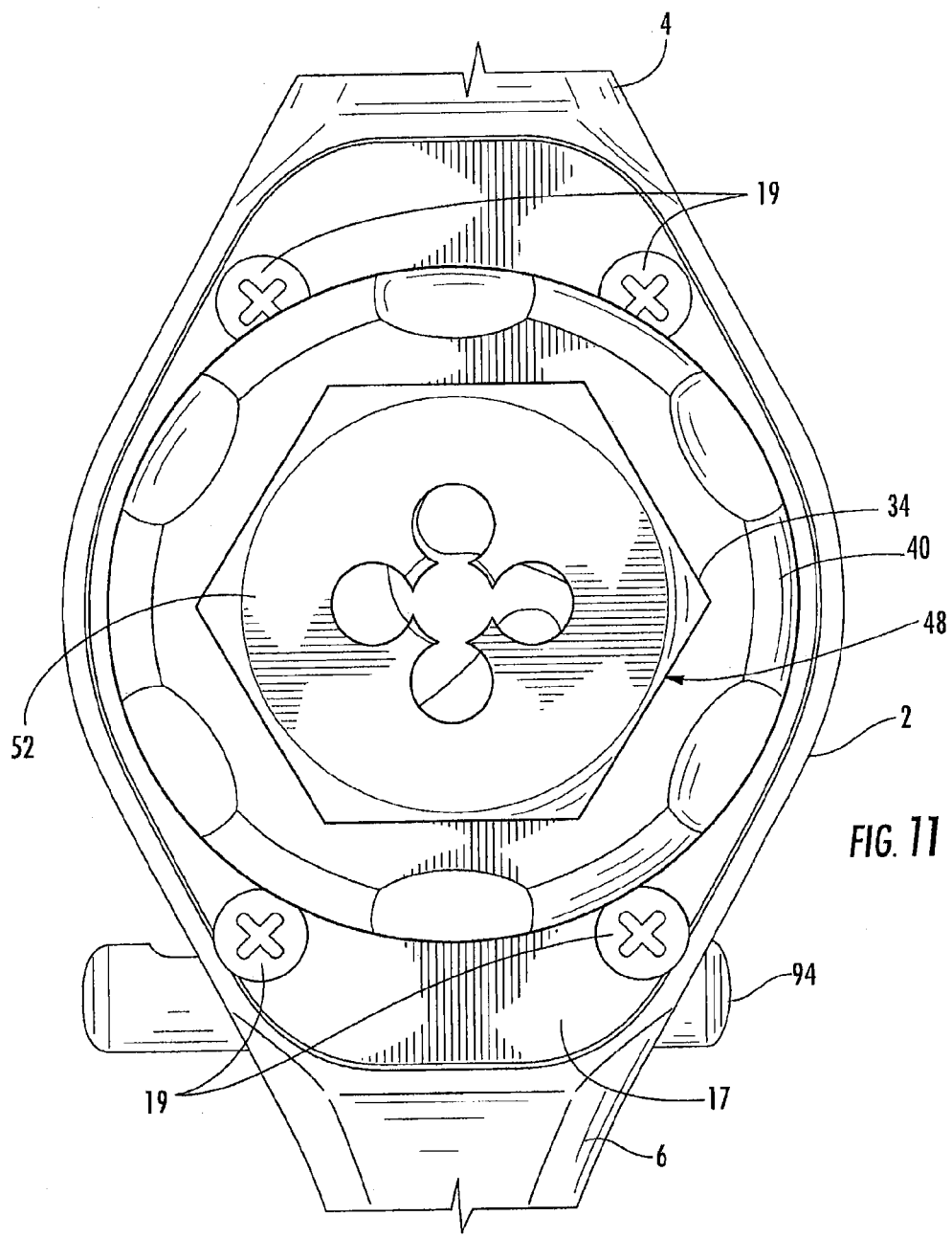
FIG. 11 is a plan view showing the die in the wrench in the unlocked position.
Figure 12:
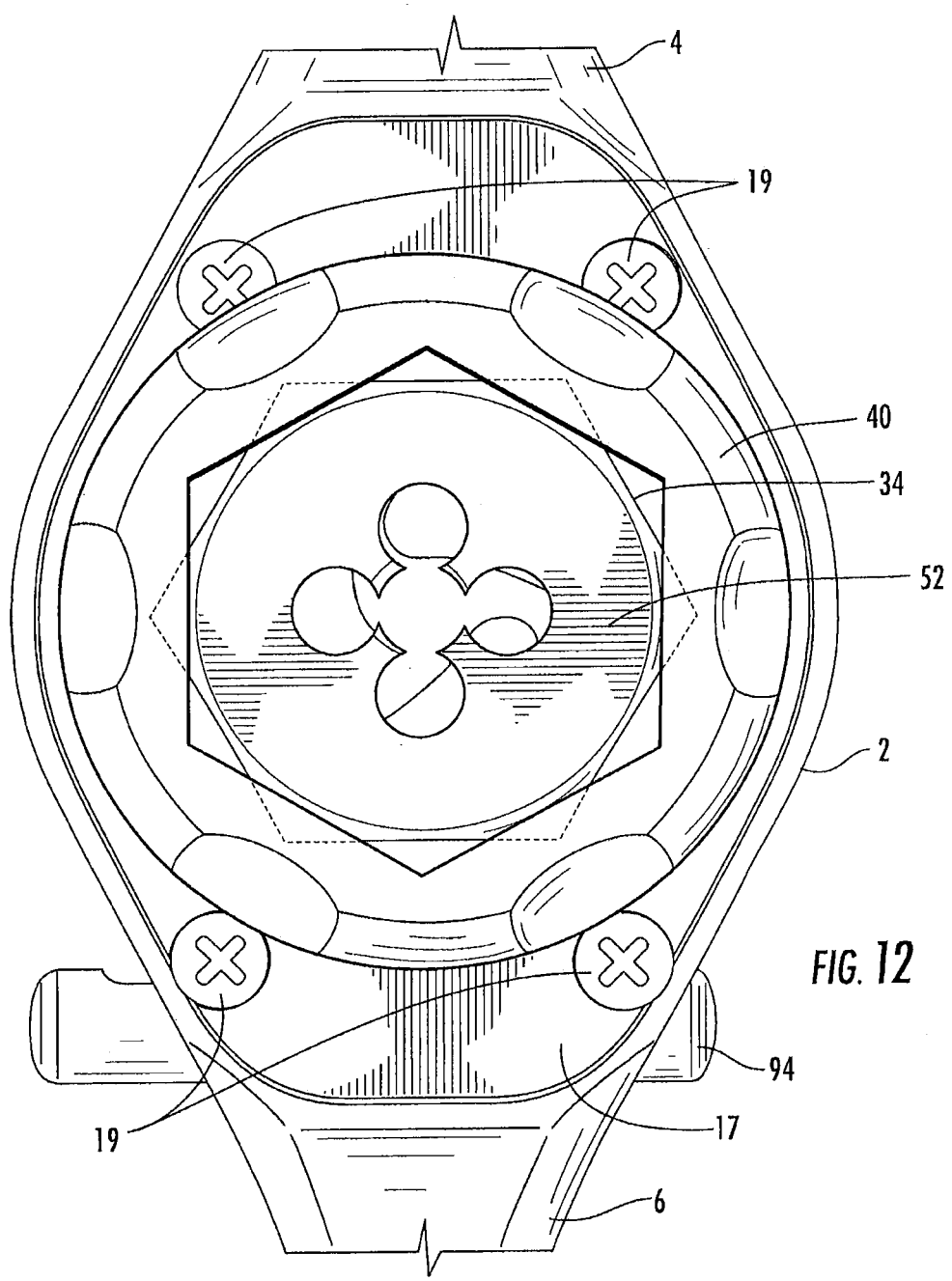
FIG. 12 is a plan view showing the die in the wrench in the locked position.
Figure 13:
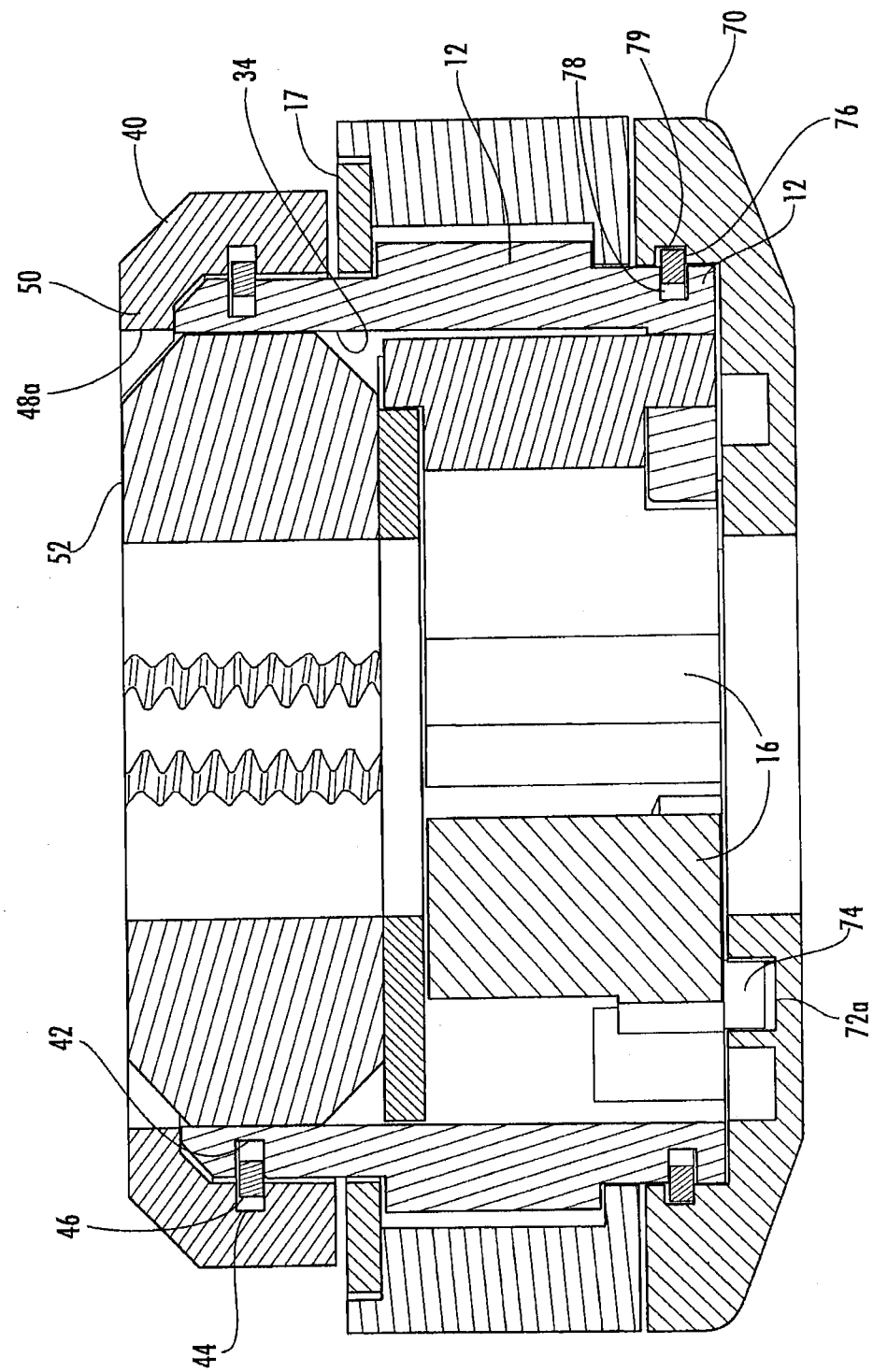
FIG. 13 is a section view showing the die in the wrench in the unlocked position.
Figure 14:
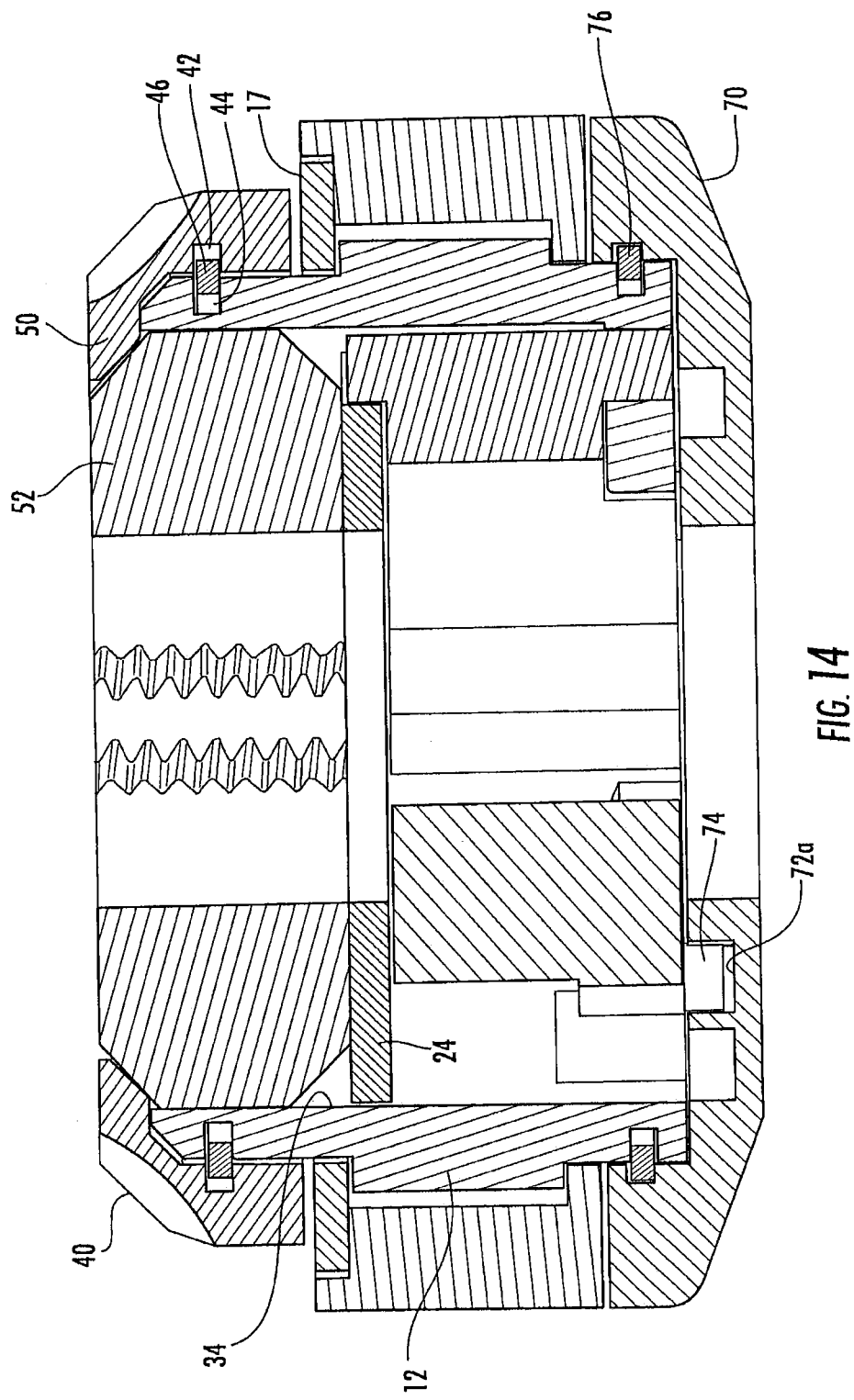
FIG. 14 is a section view showing the die in the wrench in the locked position.
Figure 15:
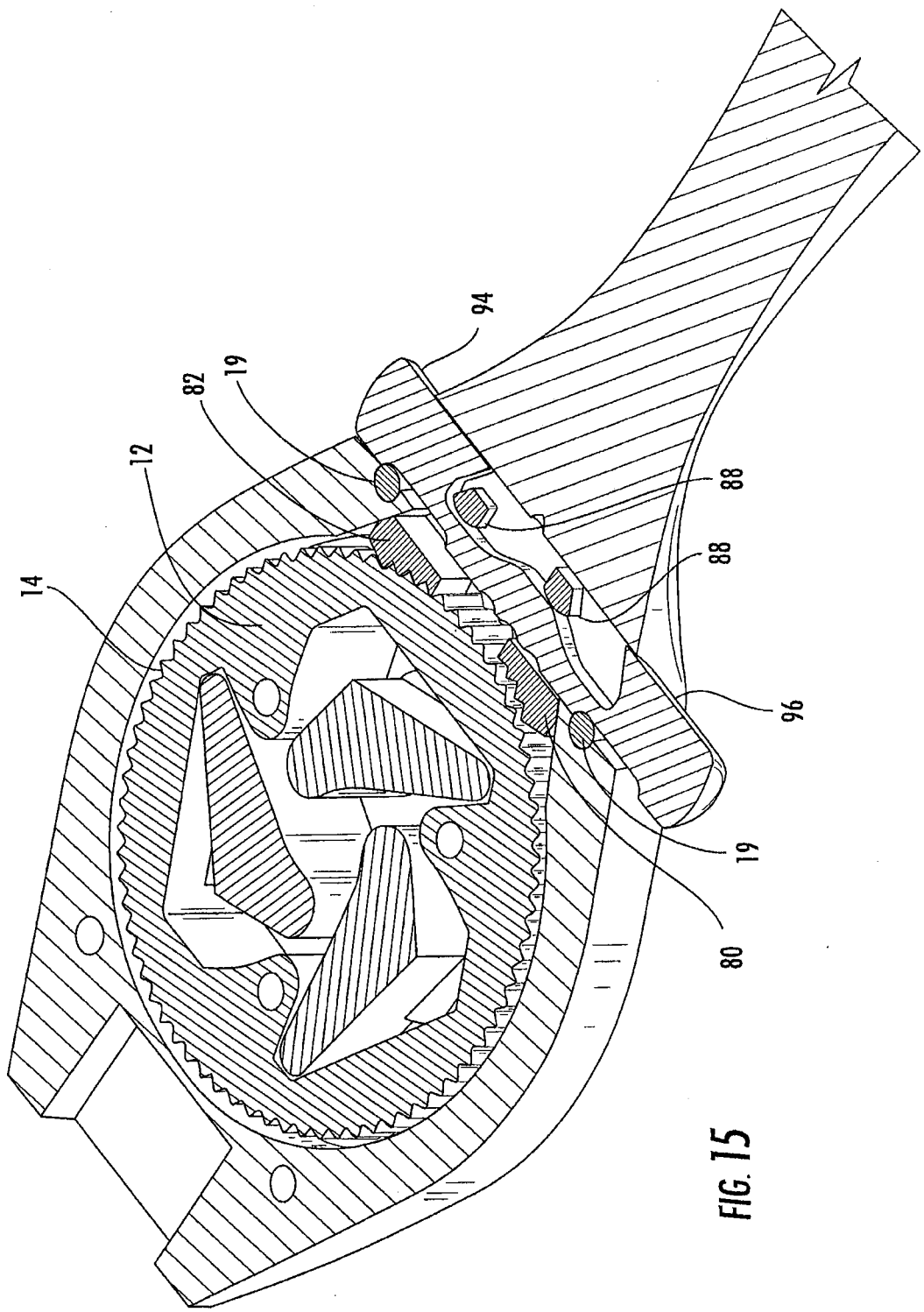
FIG. 15 is a perspective view showing the ratcheting mechanism of the wrench of FIG. 1.
Figure 16:
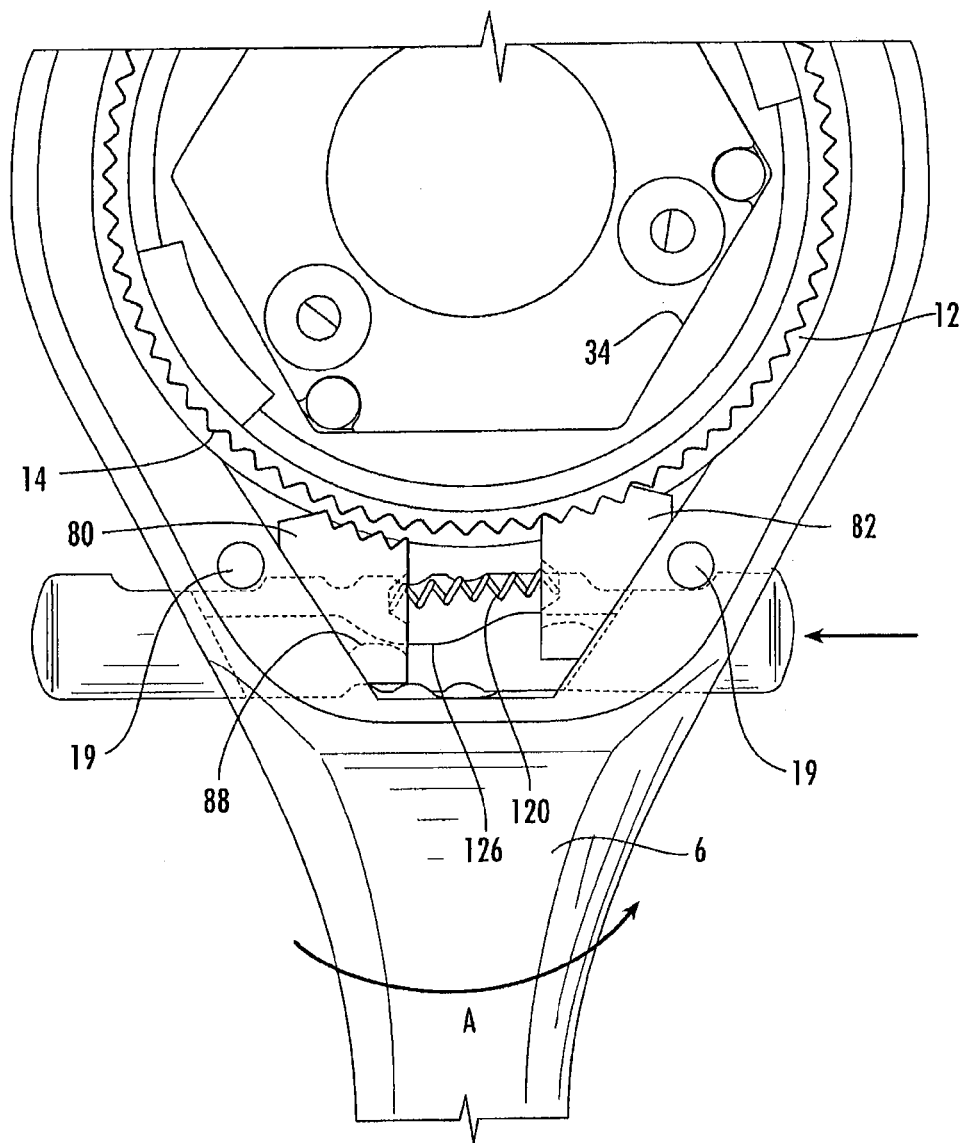
FIG. 16 is a plan view showing the ratcheting mechanism in a first ratcheting position.

Referring to FIGS. 11 through 14, the operation of the retaining ring 40 will be described. The retaining ring 40 is oriented such that the peripheral faces 48a of opening 48 are aligned with the faces 32 of socket 34 as shown in FIGS. 11 and 13. In this position the faces 32 of socket 34 and the faces 48a of retaining ring 40 are coextensive and define a receptacle for receiving a die or other tool as shown in FIGS. 10, 11 and 13. The die 52, or other tool, is inserted through the retaining ring 40 and into the socket 34 such that the flat faces 52a of the die are closely received by the flat faces 32 of socket 34. After the die 52, or other tool, is positioned in the socket 34 the retaining ring 40 is rotated relative to the body 12 to the position of FIGS. 12 and 14. In this position the faces 48a of retaining ring 48 are offset from the faces 32 of socket 34 such that the flange 50 of the retaining ring 40 extends over the corners of socket 34 and die 52 thereby preventing the die from being removed from the socket 34. The retaining ring is dimensioned and shaped such that the faces 48a extend over the chamfered edge portion of the dies 52 such that the front face of the dies and the outer surface of the retaining ring are coplanar. Making the outer surface of the retaining ring coplanar with the front face of the die allows the die to be threaded flush against a work piece.

The alignment system will now be described with reference to FIGS. 3, 4, 5 and 13. The guides 16 are supported in the annular body 12 such that they can pivot about an axis extending through pins 20 and 22. The distal ends 27 of the guides 16 are disposed such that a centrally located space 29 is created between the distal ends 27. When the guides 16 are pivoted on pins 20 and 22, the distal ends 27 of the guides can move toward and away from one another to vary the space between the distal ends. When the wrench of the invention is used as a die wrench with a die to cut or clean threads on a stud, the guides 16 are used orient the die on the stud and maintain the angular relationship between the die and the stud as the wrench 1 is rotated. The guides may also be used to support other tools as will hereinafter be described. When a die is threaded onto a stud the stud will extend through the die 52, aperture 25 formed in plate 24, the space 29 between the guides 16 and aperture 71 formed in cam plate 70. The guides 16 may be pivoted to close onto the stud such that the guides prevent the wrench and die from becoming misaligned relative to the stud.

To pivot the guides 16 and move the distal ends 27 toward and away from one another a cam plate 70 is rotatably mounted on the annular body 12. The cam plate 70 includes a plurality of spiral tracks 72a, 72b and 72c, one track corresponding to each of the guides 16. The tracks 72a, 72b and 72c may comprise grooves formed in the inner surface of the cam plate 70. Each guide 16 includes a pin 74 that is spaced from the axis of rotation of the guide and that extends from the guide toward the cam plate 70. Each pin 74 is received in one of the slotted tracks 72a, 72b and 72c such that as the cam plate 70 rotates relative to the annular body 12 the tracks 72a, 72b and 72c force the distal ends 27 of the guides 16 toward and away from one another. The cam plate 70 may be retained on the annular body 12 using a compression ring 76 that engages annular slots 78 and 79 formed on the annular body 12 and cam plate 70, respectively, that allow the cam plate to rotate relative to the annular body but prevent the cam plate from becoming separated from the body (FIG. 13).

Figure 20:
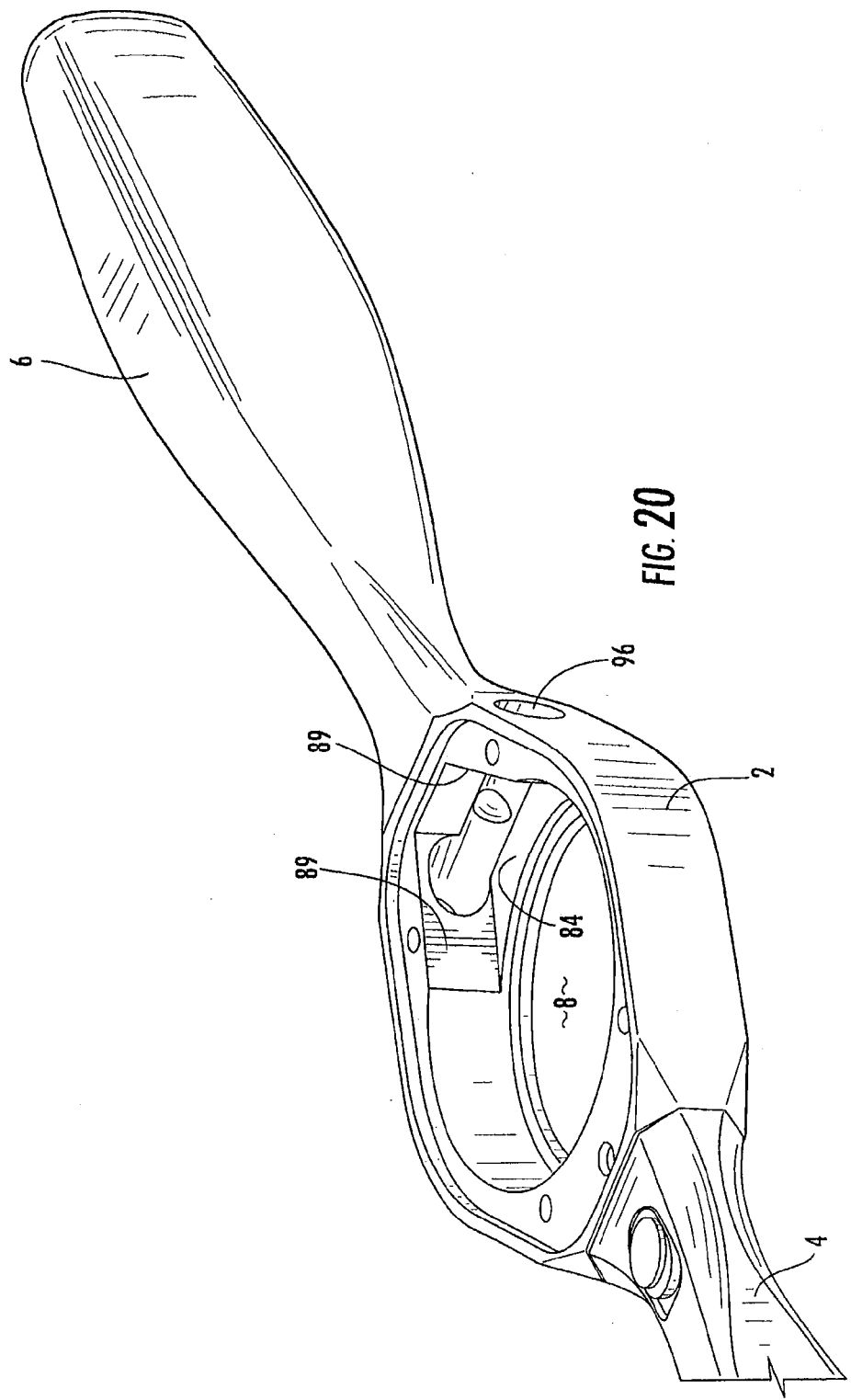
FIG. 20 is a perspective view showing the wrench with the wrench assembly removed.
Figure 21:
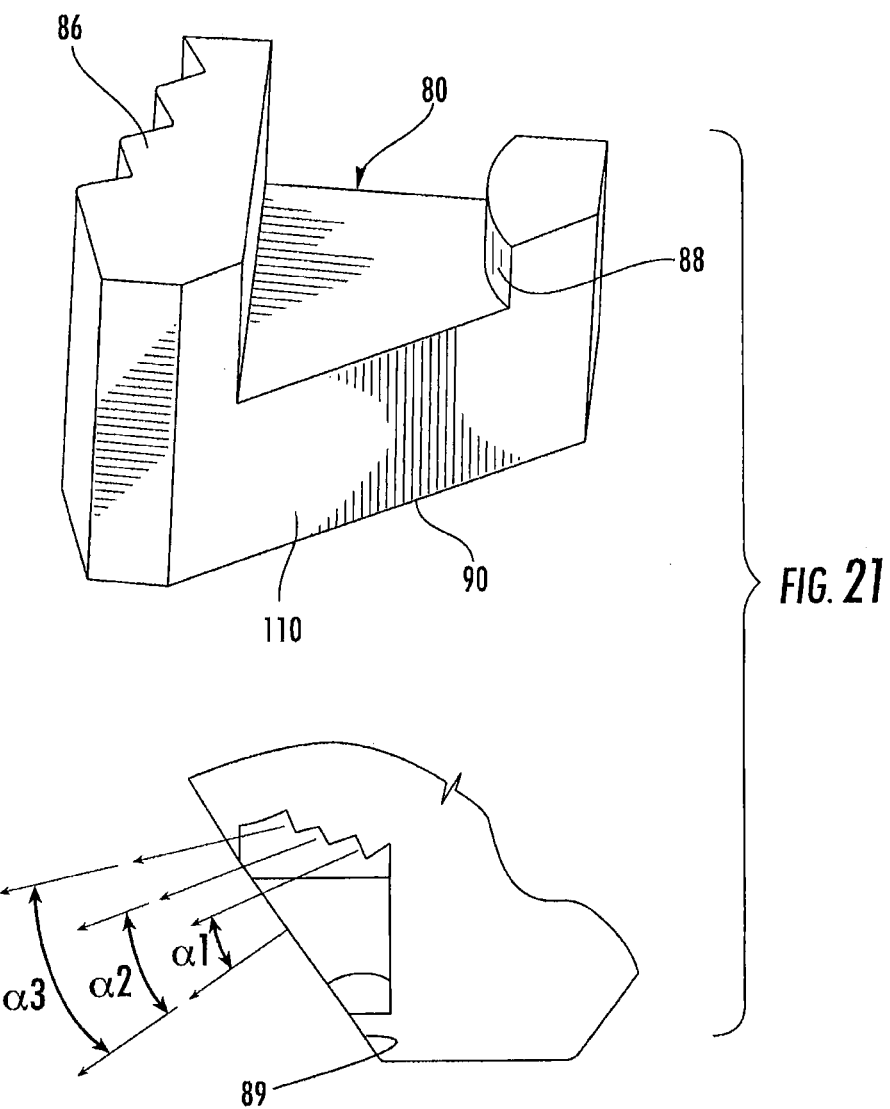
FIG. 21 is a perspective view of a pawl of the ratcheting mechanism.

The ratcheting mechanism will be described with reference to FIGS. 15 through 22. The ratcheting mechanism includes a first pawl 80 and a second pawl 82 located in a recessed area 84 of housing 12 adjacent the cavity 8 (FIG. 20). The assembly is configured such that pawls 80 and 82 are positioned adjacent to the ratchet teeth 14 formed on the annular body 12. Pawl 80 is configured as shown in FIG. 21 and includes a plurality teeth 86 formed on pawl body 90 and dimensioned to engage the teeth 14 formed on the annular body 12. Pawl 80 includes a cam surface 88 that extends from the cam body 90. Pawl 82 is a mirror image of pawl 80. To ensure that the paws lock tight with teeth 14 an angle $\alpha$ is provided between the tooth force and the pawl side normal force where $\alpha_1$, $\alpha_2$, and $\alpha_3$ are all greater than 0.

A rod 94 is inserted in a bore 96 that extends transversely through the wrench housing where the bore 96 is open to recessed area 84. The rod 94, shown in detail in FIG. 22, includes a camming surface 98 formed such that the cam surfaces 88 on the pawls 80 and 82 extend into and contact the camming surface 98. The rod 94 is formed with end portions 102 and 104 that are connected too one another by a reduced thickness center portion 106. The camming surface 98 is formed on the side of center portion 106 opposite the annular body 12. The pawls 80 and 82 and rod 94 are positioned such that the central portion 106 is disposed over the pawl body 90 with the cam surfaces 88 extending into contact with the camming surface 98. The pawls are further arranged such that the angled lateral surface 110 of each pawl slides against the outer angled surface 89 of the recessed area 84. Screws 19, extending transversely across bore 96 to engage faces 114 formed on the rod 94 to limit the travel of the rod 94 in the bore 96. Further, detents 116, 117 and 118 are provided on the rod 94 that are engaged by a spring loaded ball to temporarily fix the rod in one of three positions—a clockwise rotation position, a counterclockwise rotation position and a locked position. The spring loaded ball is positioned in bore 119 in recessed area 84 and is forced to an extended position by a compression spring located in bore 119.

A compression spring 120 is located between the pawls 80 and 82. Spring 120 is compressed between the pawls 80 and 82 such that the spring exerts a pressure tending to spread the pawls apart. The engagement of the angled surface 110 on the pawls 80 and 82 with the angled surfaces 89 of the recessed area 84 causes the pawls to slide along surfaces 89 and into engagement with the ratchet teeth 14 under the force exerted by spring 120.

Figure 22:
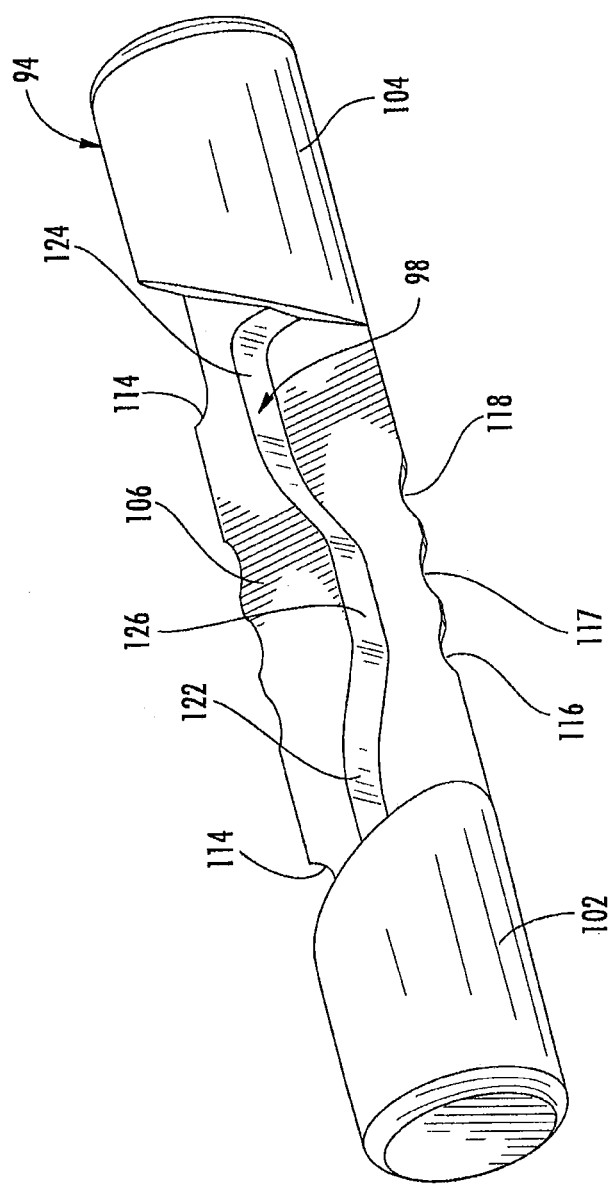
FIG. 22 is a perspective view of the cam rod of the ratcheting mechanism.

The camming surface 98 on the rod 94 is arranged such that it has three sections. The first section 122 and the third section 124 are set back relative to the middle section 126 as shown in FIG. 22. When the rod is in the first position shown in FIG. 16 middle section 126 of camming surface 98 engages the cam surface 88 on pawl 80 to overcome the force exerted by the spring 120 and force the pawl 80 away from the ratchet teeth 14. In this position the end section 126 of camming surface 98 does not contact the cam surface of pawl 82 such that spring 120 forces the pawl 82 into engagement with ratchet ring 14. In this position handles 4 and 6 are free to rotate relative to the body 12 and socket 34 as shown by arrow A but are locked in a direction opposite to arrow A.

Figure 17:
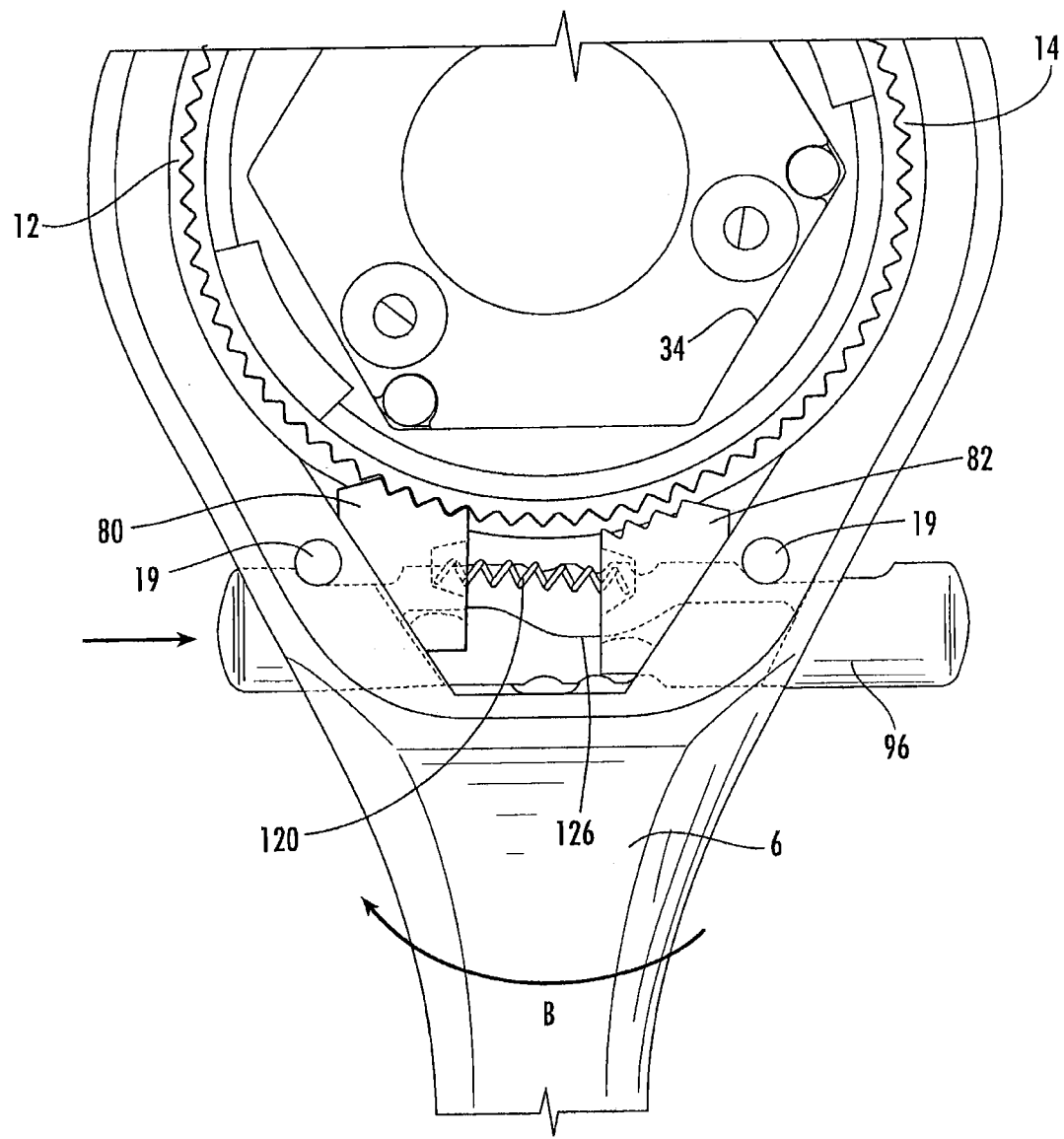
FIG. 17 is a plan view showing the ratcheting mechanism in a second ratcheting position.

When the rod is in the second position shown in FIG. 17 middle section 126 of camming surface 98 engages the cam surface 88 on pawl 82 to overcome the force exerted by the spring 120 and force the pawl 82 away from the ratchet teeth 14. In this position the end section 122 of camming surface 98 does not contact the cam surface of pawl such that spring 120 forces the teeth of pawl 80 into engagement with ratchet ring 14. In this position handles 4 and 6 are free to rotate relative to body 12 and socket 34 as shown by arrow B but are locked in a direction opposite to arrow B.

Figure 18:
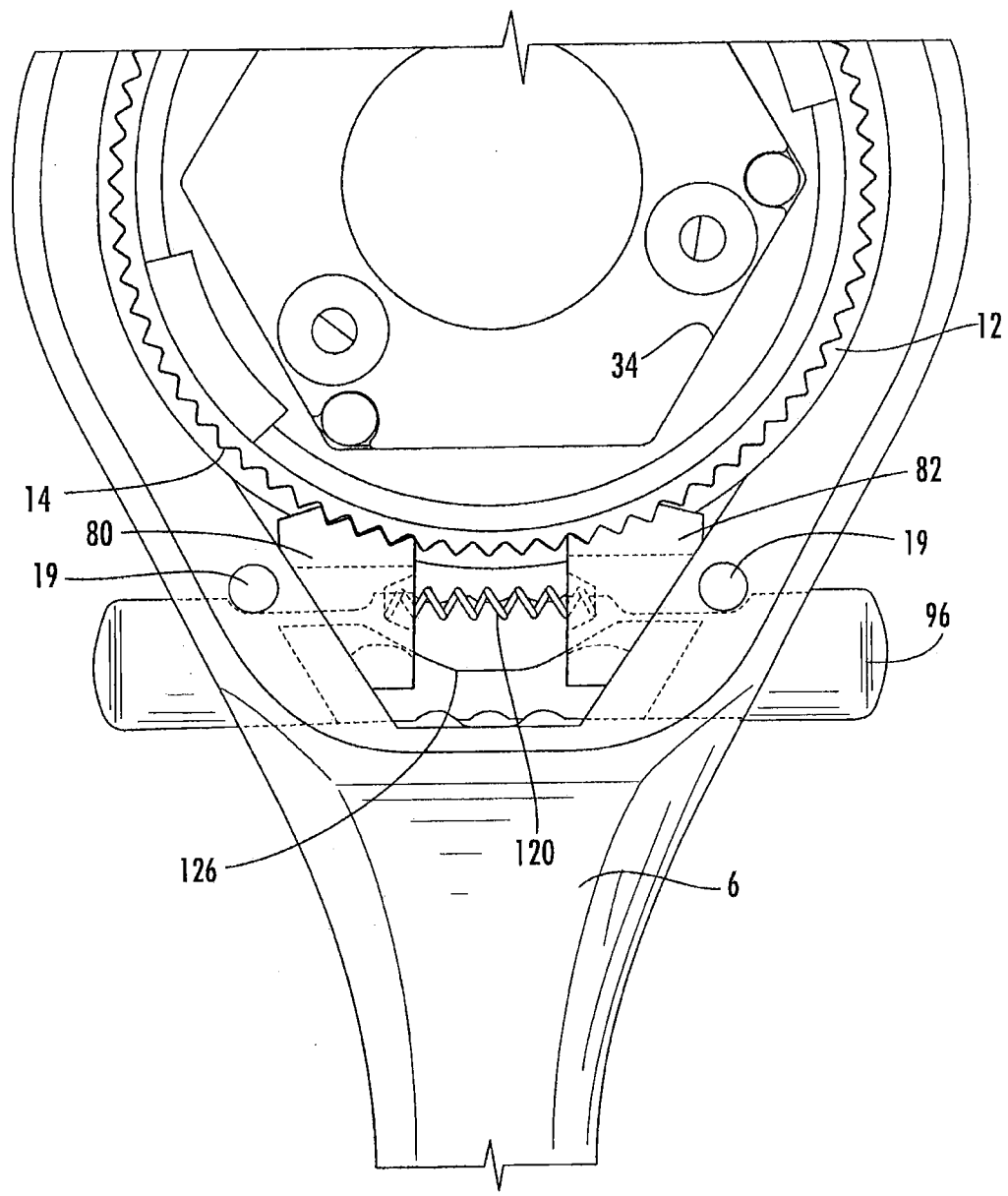
FIG. 18 is a plan view showing the ratcheting mechanism in a locked position.
Figure 19:
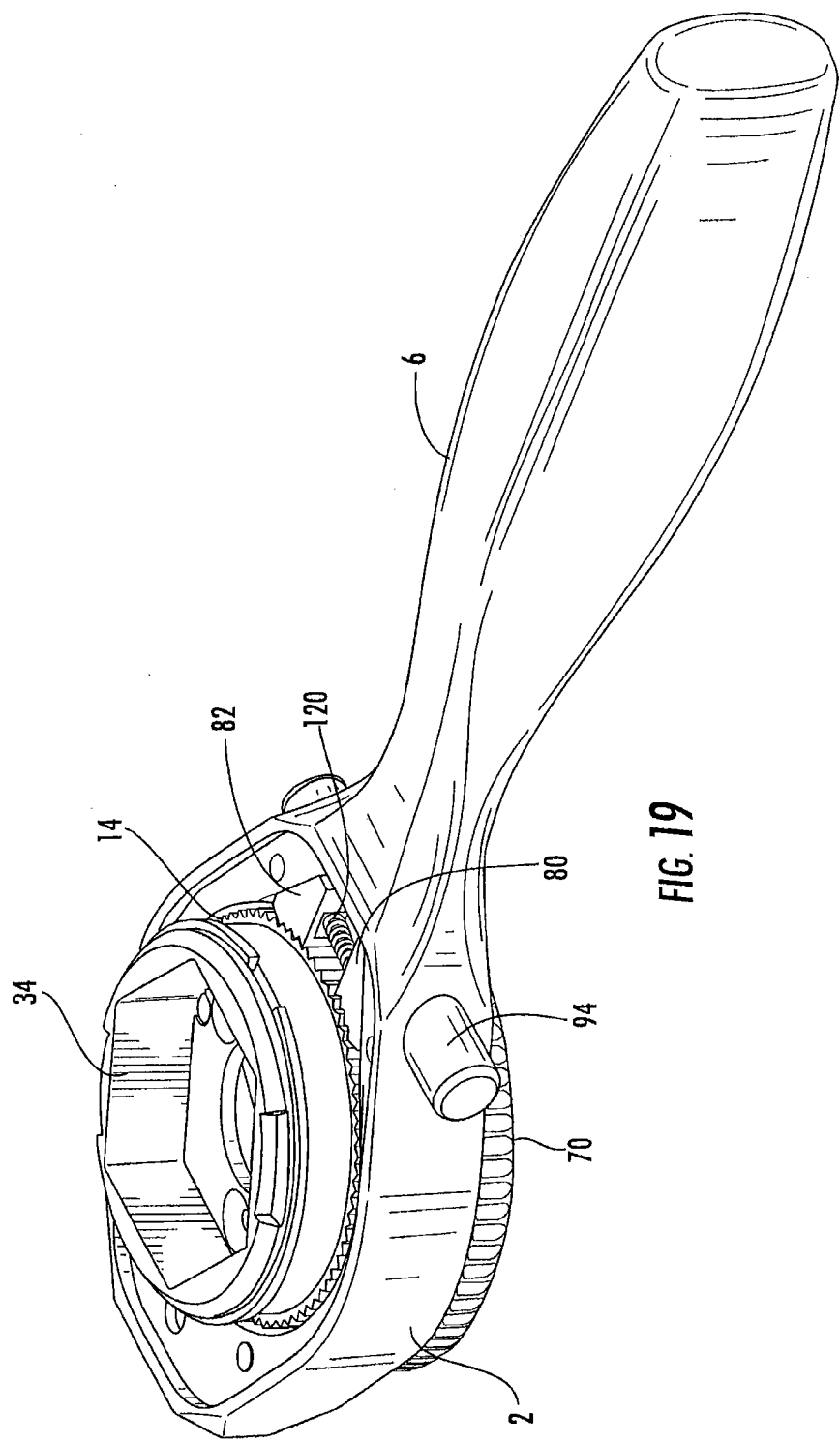
FIG. 19 is a perspective view of the ratcheting mechanism with the retainer removed.

When the rod 94 is in the third position shown in FIG. 18 middle section 126 of camming surface 98 does not engage either of the cam surfaces on either of the pawls 80 or 82. In this position, spring 120 forces both pawls 80 and 82 into engagement with ratchet ring 14. In this position the body 12 and socket 34 cannot rotate relative to the handles 4 and 6 in either direction and the wrench may be used without any ratcheting action.

Figure 23C:
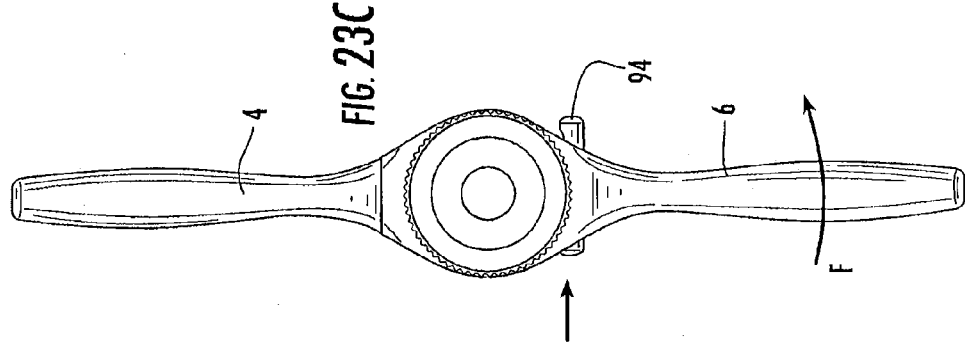
FIGS. 23A, 23B and 23C are plan views showing operation of the ratcheting mechanism of the invention.
Figure 23B:
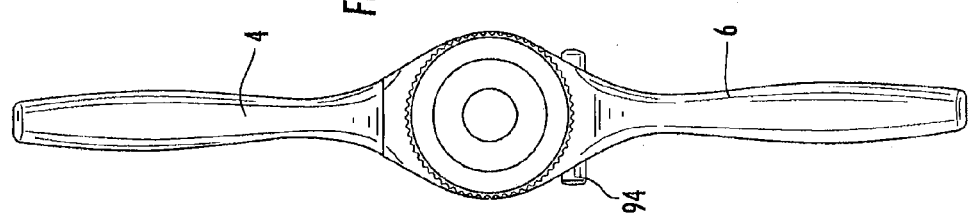
Figure 23A:
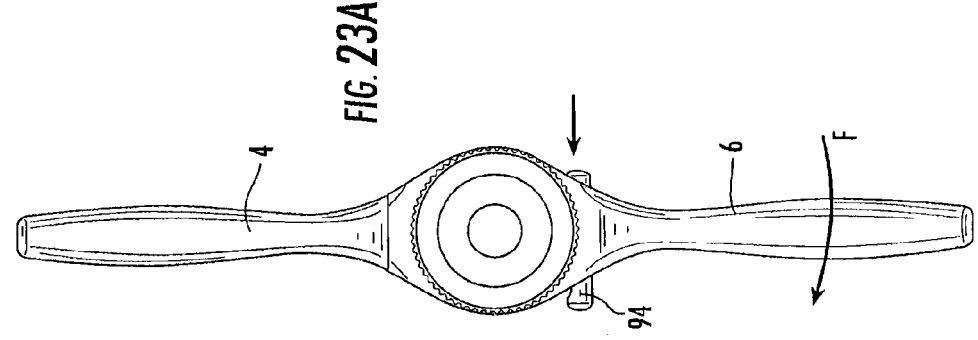

One advantage of the ratchet of the invention is that the rod 94 is moved in the same direction as the working direction of the wrench such that the use of the ratchet is intuitively easy to use. Referring to FIG. 23a when the rod 94 is moved to the left as illustrated the ratchet is locked in the clockwise direction (the working direction) such that the force F may be applied to the handle in the same direction as the rod was moved. Similarly, when the rod 94 is moved to the right to the illustrated position shown in FIG. 23c the ratchet is locked in the counter-clockwise direction (the working direction) such that a force F may be applied to the handle in the same direction the rod was moved. In operation the user can simply grasp handle and move the rod in the same direction that user wants the wrench to operate. FIG. 23b shows the rod in the middle position where the ratchet is locked in both directions.

The wrench of the invention further may be provided with a removable handle such that the wrench can be converted from a two handle device to a single handle device. Handle 4 is shown in FIGS. 3, 24 and 25 and includes a protrusion 140 that is closely received in a receptacle 142 formed on housing. A ball 144 biased to an extended position engages a detent formed internally of the receptacle 142 to retain the handle 4 in the housing. A plunger 146 is disposed in a bore 148 that extends along the longitudinal axis of the handle 4. The plunger 146 is biased outwardly toward the end of the handle by a compression spring 150 that is compressed between the end of the bore 148 and the end of the plunger 146. The plunger 146 includes a cam surface 152 that forces the ball 144 to extend through hole 154 formed in protrusion 140. Hole 154 is dimensioned such that the ball cannot pass completely through the hole but the ball can protrude from the hole. A slide button 156 serves both to actuate the mechanism for removal of the handle and to maintain the plunger 146 in the bore 148. The slide button 156 includes a button portion 158 that is exposed to the outside of the handle. Extending from the button portion 158 and into bore 148 through transverse slot 162 is a hook 160. Hook 160 engages a slot 164 formed in the plunger 146 such that as the button is reciprocated in slot 162 hook moves plunger from its extended position to a retracted position. Spring 150 returns plunger 146 to the extended position when no counteracting force is exerted on button 156. In the extended position cam surface 15 forces ball 144 to protrude from hole 154 where the ball can engage a detent in the housing to lock the handle on the housing. In the retracted position of plunger 146, cam surface 152 is displaced from ball 144 such that the ball can retract into hole 154. In this position the ball does not lock the handle into the housing such that the handle may be removed. The handle may be removed to allow the wrench to access fasteners or studs in applications where space is limited and the use of two handles is difficult or impossible.

To assemble the handle, the spring 150 is inserted into bore 148. The plunger is then inserted into the bore and spring 150 is compressed by exerting pressure on the end of the plunger. The plunger is inserted until slot 164 is aligned with slotted hole 162. The hook of button 156 is inserted into slotted hole 162. The engagement of hook with slot 164 prevents the plunger from being expelled from the bore 148 even though spring 150 is compressed in the bore. The ball 144 is inserted into bore 148 and aligned with hole 154. The area around hole 154 is crimped to maintain ball 144 in position adjacent hole 154.

Figure 26:
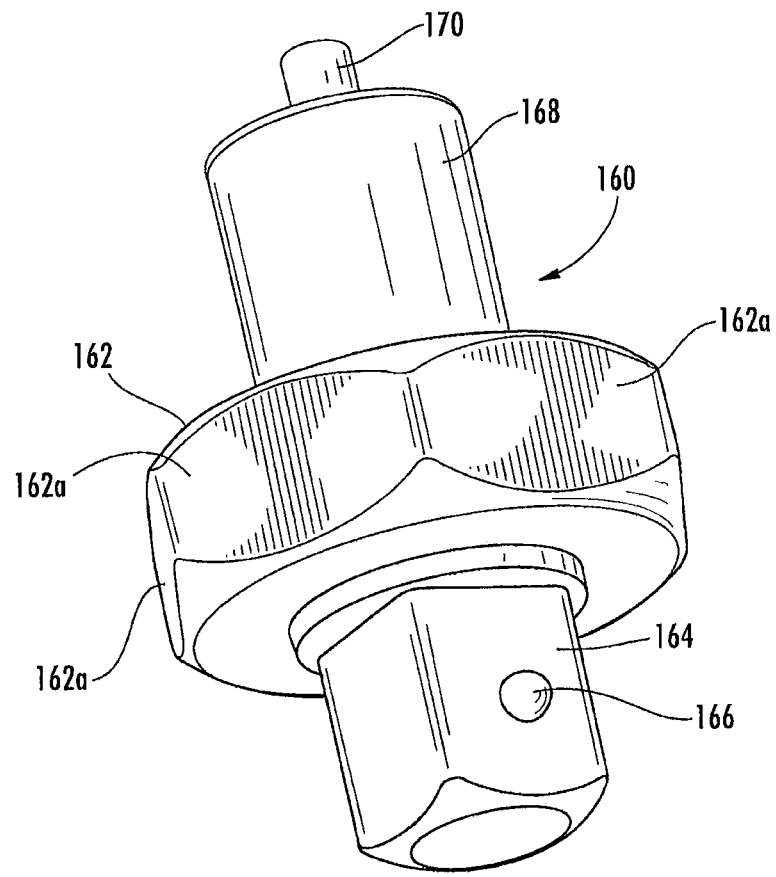
FIG. 26 is a perspective view of one embodiment of a tool for use with the wrench of the invention.

Referring to FIG. 26 a tool for use with wrench 1 is shown that comprises an adapter 160 that allows the wrench 1 to be used with conventional sockets. The adapter comprises a collar 162 having a plurality of faces 162a that correspond to the faces 32 of socket 34. The collar 162 can be positioned in the socket 34 such that the adapter is prevented from rotating relative to the body 12. The retaining ring can be rotated to retain the adapter 160 in the socket 34 as previously described. A drive such as square drive 164 extends from one side of collar 162 that may be inserted into the female coupling of a tool such as a standard socket. A spring loaded ball 166 may be provided for locking the tool to the adapter 160. The adapter may further include an extension 168 extending from the side of the collar 162 opposite drive 164. The extension 168 may extend into space 29 between the guides 16 such that the engagement of the guides with the adapter may provide further stability and alignment between the tool and the wrench. A push button release 170 may also be provided to release the ball 166 from the socket or other tool. While the tool has been described with specific reference to the adapter 160, the tool may comprise any tool that can advantageously be rotated by the wrench of the invention. For example, a tap may be provided with a collar such as collar 162 that can be retained by the socket 34. Further, the tool may comprise other tools such as screw drivers tips, drill bits or the like that are provided with a collar such as collar 162 formed integrally therewith or formed as a separate component. Further, square drive 164 of adapter 160 may be replaced by a chuck or female receptacle.

Figure 27:
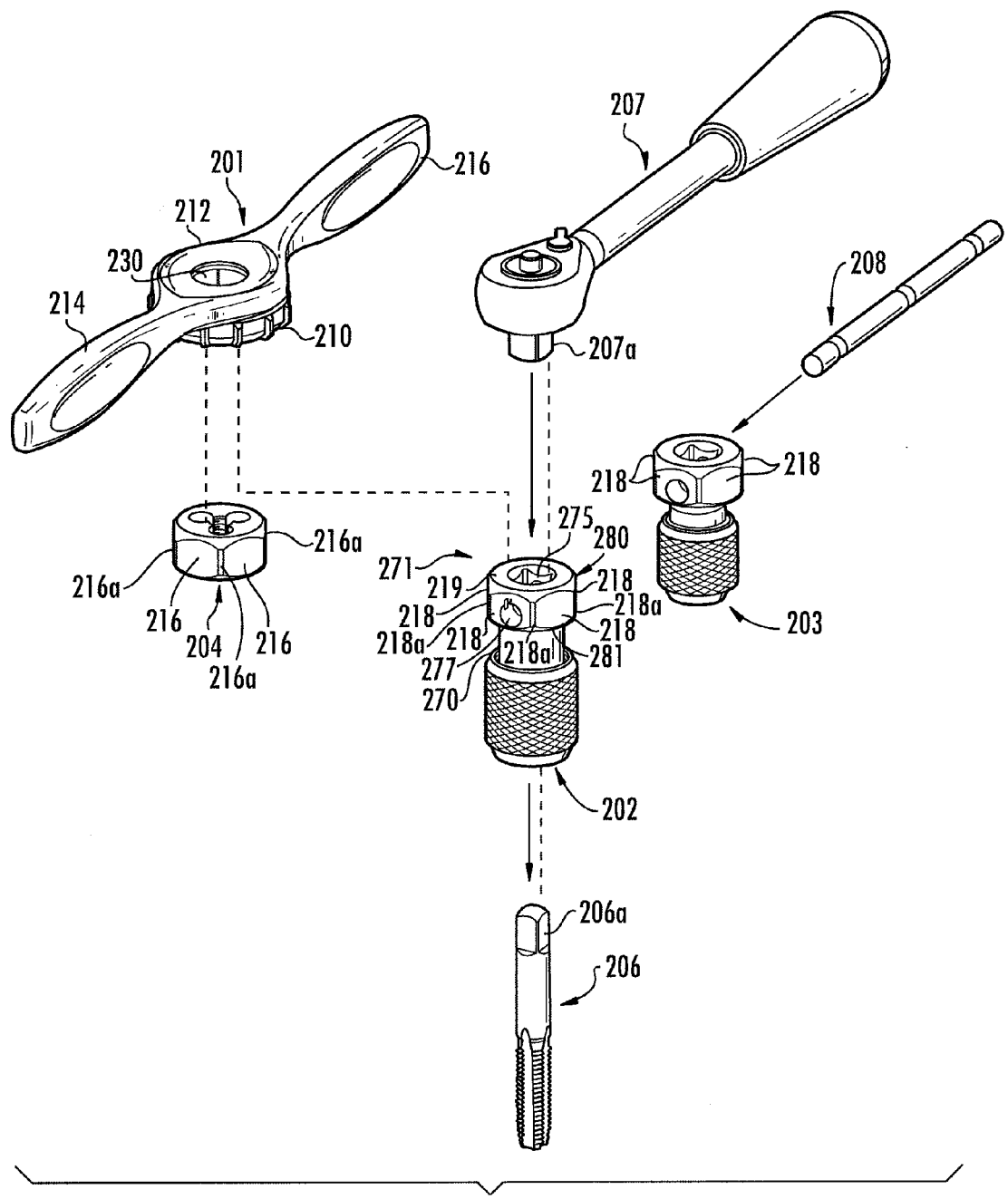
FIG. 27 is a perspective view showing an embodiment of the components of the flexible threading system.

Referring to FIGS. 27 through 38, embodiments of the components of the flexible threading system of the invention are shown. The flexible threading system may comprise a wrench or handle 201, at least one adapter that may include a large adapter 202 and small adapter 203, at least one die 204, at least one tap 206 and an adapter bar 208. A plurality of taps 206 and dies 204 in a wide variety of sizes may be provided as shown in the set shown in FIG. 28. FIG. 27 further shows a traditional ratchet wrench 207, which may typically not be provided with the set, with which the adapters 202 and 203 of the invention may be used.

The wrench 201 includes a retaining member in the form of a retaining ring 210 that retains the dies 204 and adapters 202, 203 in a similar manner as the embodiment shown in FIGS. 1 to 25. The wrench 201 differs from the embodiment shown in FIGS. 1 through 25 in that the handles 214 and 216 are both fixed to the body 212. The wrench 201 also eliminates the ratchet mechanism and alignment guide previously described with reference to the embodiment of the wrench shown in FIGS. 1 through 25.

As shown in FIGS. 27 and 31 through 38, the body 212 includes a centrally located cavity 230 having a periphery defined by a plurality of flat faces 232 arranged to create a socket 234 that receives a die 204 or adapter 202, 203. The flat faces 232 engage the flat faces 216 of the die 204 or the flat faces 218 of adapters 202, 203 such that the die or adapter is prevented from rotating relative to the body 212 when retained in socket 234. Where hexagonal dies are used, the flat faces 232 form a hexagonal socket.

The retaining member in the form of a retaining ring 210 is located on the body 212 such that it rotates relative to the body. The retaining ring 210 may be connected to the body 212 by a compression ring 211 that expands into annular recesses formed on the body 212 and retaining ring 210, respectively, as previously described. The retaining ring 210 is formed with an opening 248 that has a periphery defined by faces 249 that are substantially coextensive with the faces 232 of socket 234. Each face 249 includes a recess 249a that receives the edge of the die or adapter as will be described. The back of recess 249a matches the shape of socket 234 and the top of recess 249a matches the shape of chamfer 255 of die 204. The retaining ring 210 is held in the open and locked position by a spring loaded ball 251 that engages one of two recesses 253 formed on the underside of the retaining ring 210. When the retaining ring 210 is rotated the ball is pushed against the spring to allow the ring to rotate. When the retaining ring 210 is located in either the locked or open position the spring forces the ball into engagement with recess 253.

The operation of the retaining ring 210 is similar to that as previously described. The retaining ring 210 is oriented in a first position such that the peripheral faces 249 of opening 248 are aligned with the faces 232 of socket 234 as shown in FIGS. 31 through 34 to allow a mating die or adapter to be inserted into socket 234. In this position the faces 232 of socket 234 and the faces 249 of retaining ring 210 are aligned and coextensive with one another and define a passageway for receiving a die or adapter. The die 202, or adapter 202, 203, is inserted through the retaining ring 210 and into the socket 234 such that the flat faces 216 of the die, or the flat faces 218 of the adapter, are closely received by the flat faces 232 of socket 234.

After the die 204, or adapter 202, 203, is positioned in the socket 234 the retaining ring 210 is rotated relative to the body 212 to a second locking position as shown in FIGS. 35 through 38. In the second position the faces 249 of retaining ring 210 are offset from the faces 232 of socket 234 such that the chamfered corners of the die extend into recesses 249a and the faces 249 of the retaining ring 210 extend over the corners 216a, 218a of the die or adapter, respectively. The engagement of the retaining ring 210 with the corners of the die or adapter prevents the die or adapter from being removed from the socket 234. The retaining ring 210 is dimensioned and shaped such that the faces 249 extend over the chamfered edge portion 255 of the dies 204 and adapters 202, 203 such that the front exposed face of the dies 204 and the outer surface 210b of the retaining ring 210 are coplanar. Making surface 210b coplanar with the die allows the die to be threaded flush against a work piece.

Figure 30:
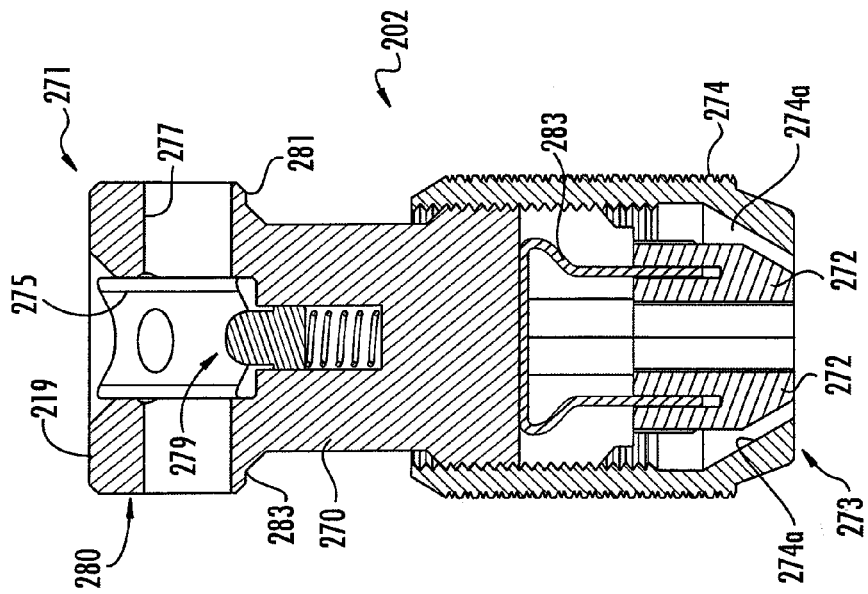
FIG. 30 is a section view of the adapter of FIG. 30.
Figure 29:
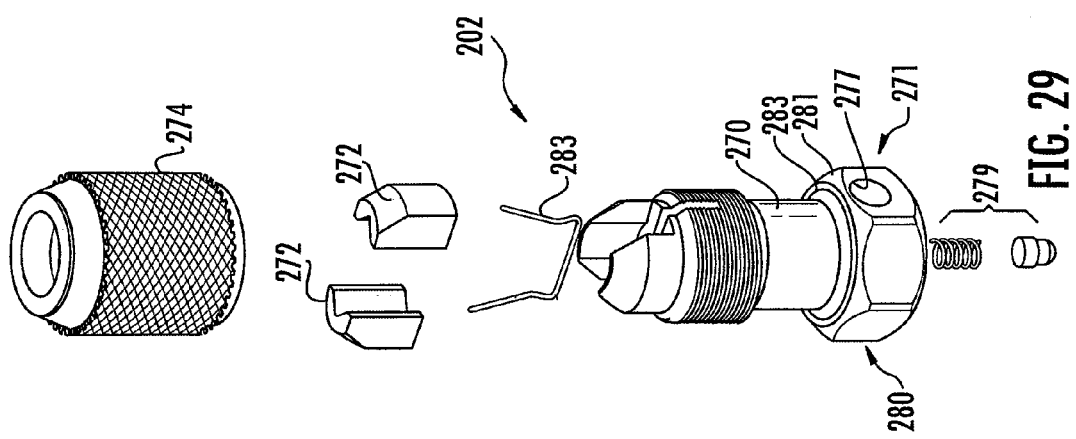
FIG. 29 is an exploded view of one embodiment of the adapter of the flexible threading system of the invention.
Figure 31:
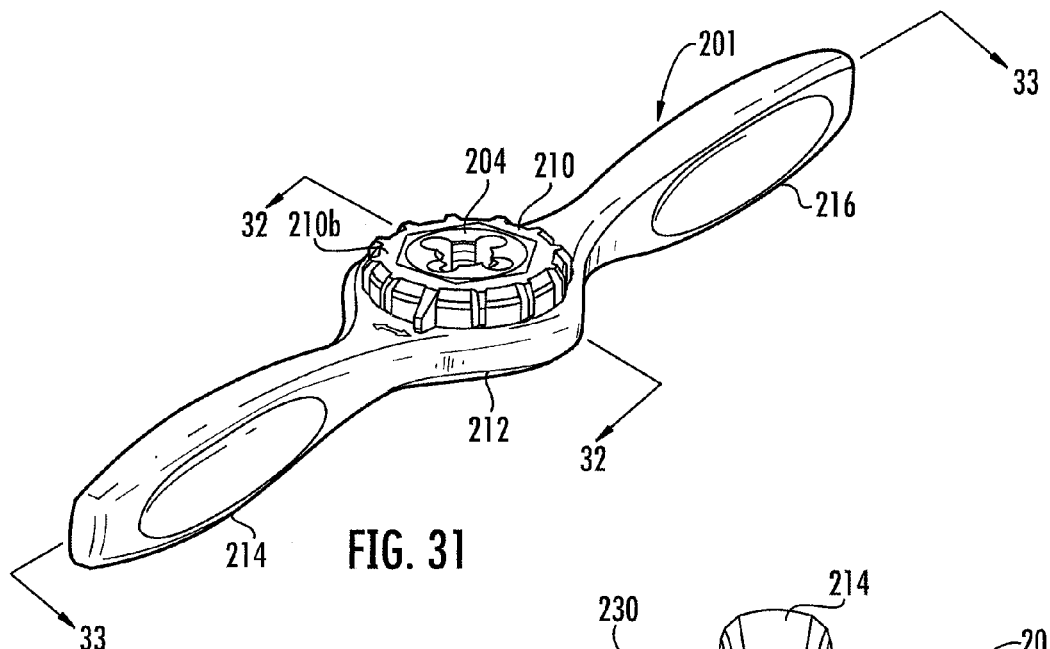
FIG. 31 is a perspective view of the wrench of FIG. 27 with a die in the unlocked position.
Figure 32:
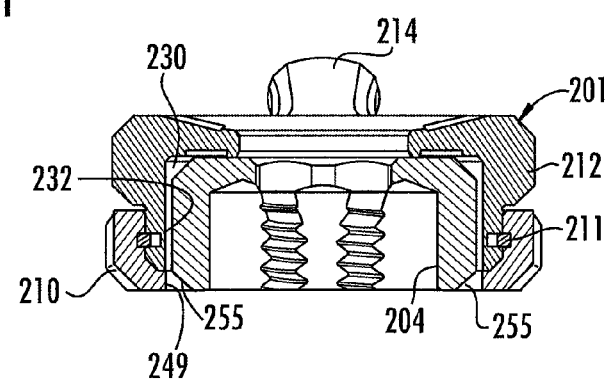
FIG. 32 is a section view taken along line 32-32 of FIG. 31.
Figure 33:
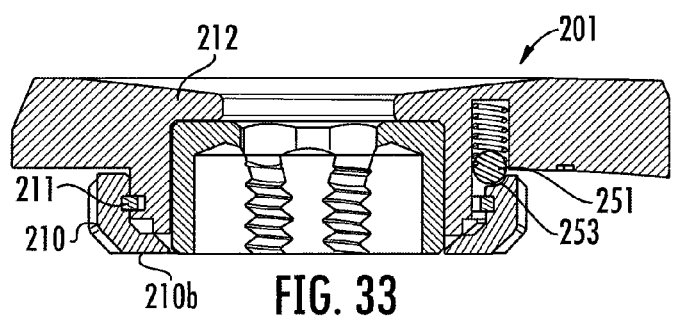
FIG. 33 is a section view taken along line 33-33 of FIG. 31.
Figure 34:
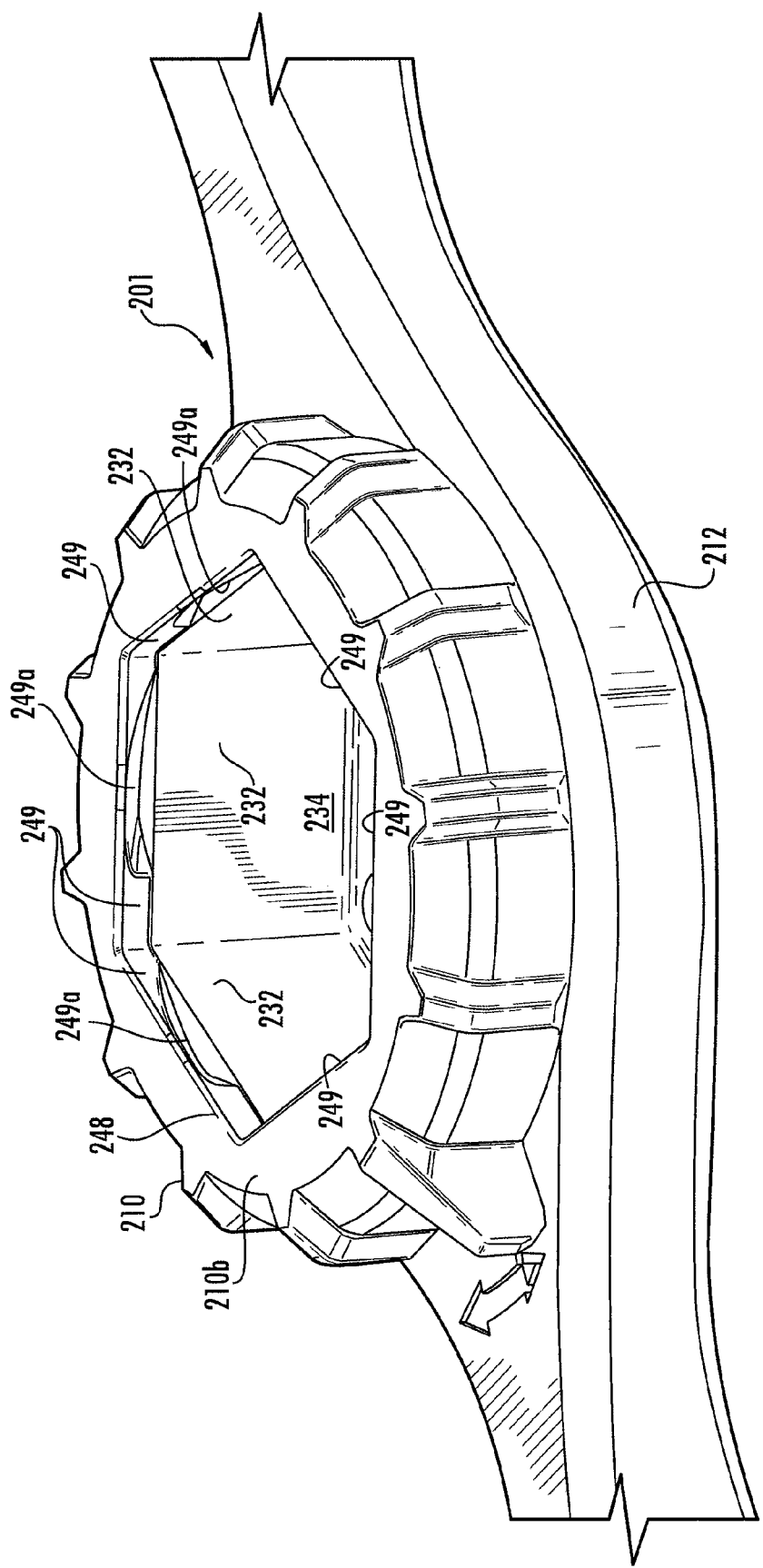
FIG. 34 is a partial perspective view of the wrench of FIG. 27 without a die in the unlocked position.
Figure 35:
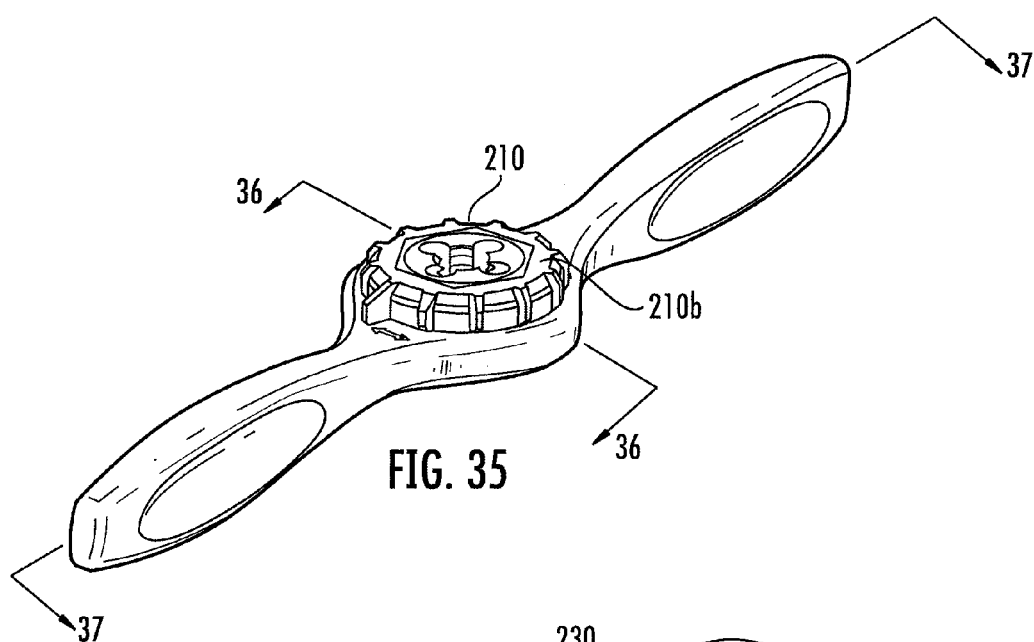
FIG. 35 is a perspective view of the wrench of FIG. 27 with a die in the locked position.
Figure 36:
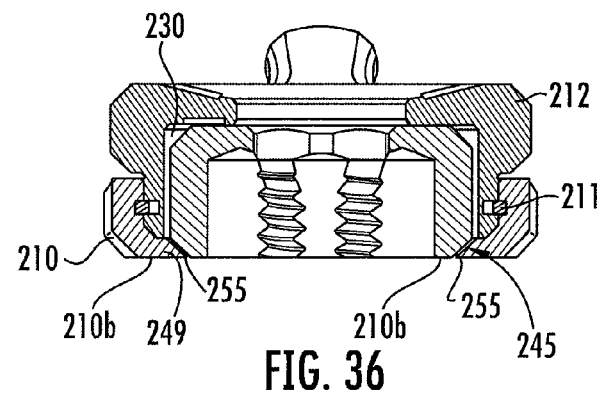
FIG. 36 is a section view taken along line 36-36 of FIG. 35.
Figure 37:
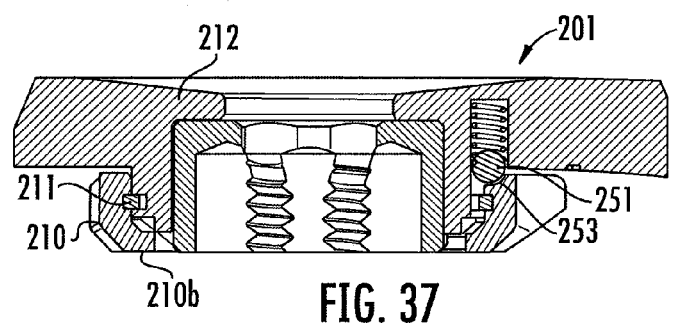
FIG. 37 is a section view taken along line 37-37 of FIG. 35.
Figure 38:
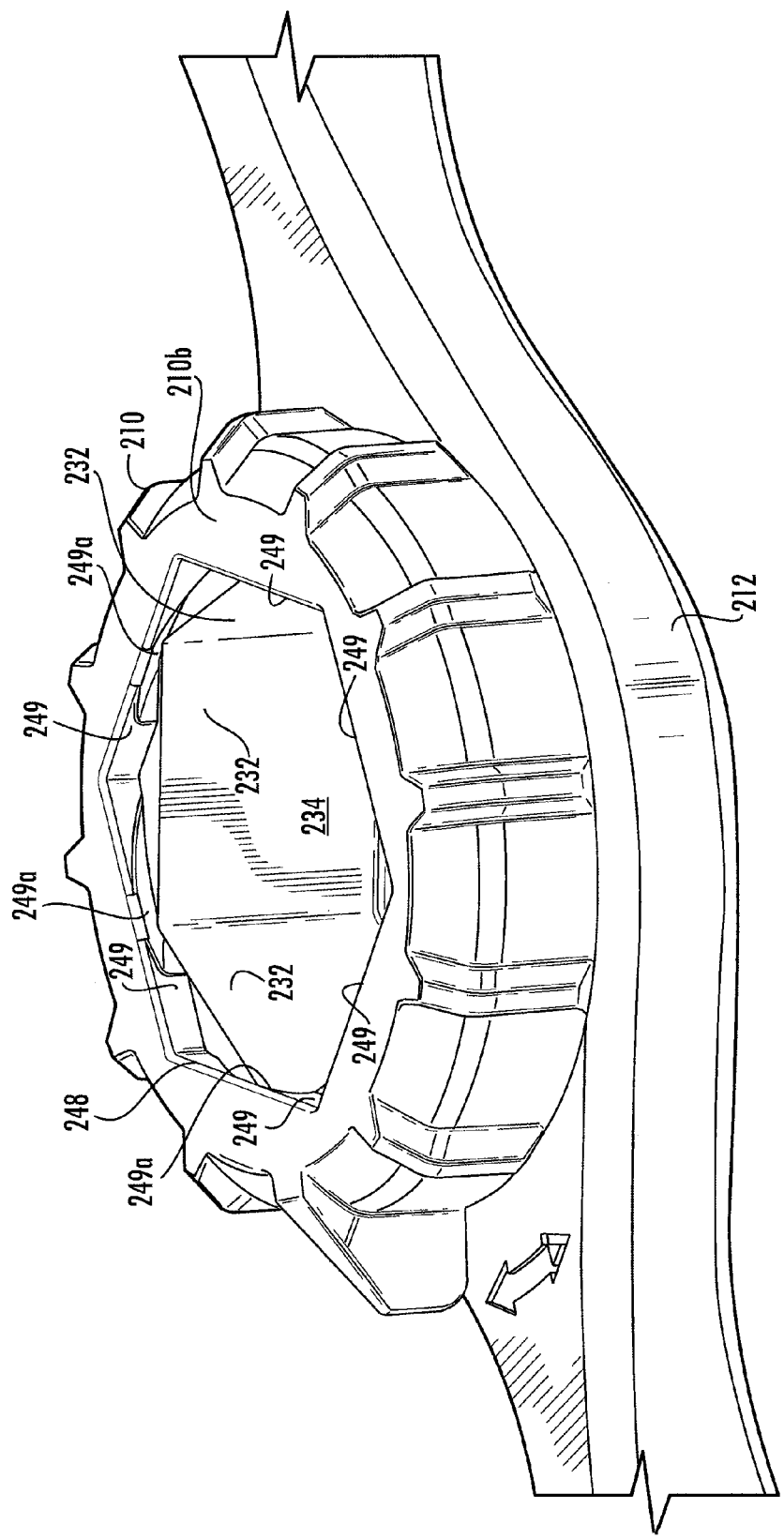
FIG. 38 is a partial perspective view of the wrench of FIG. 27 without a die in the locked position.
Figure 39:
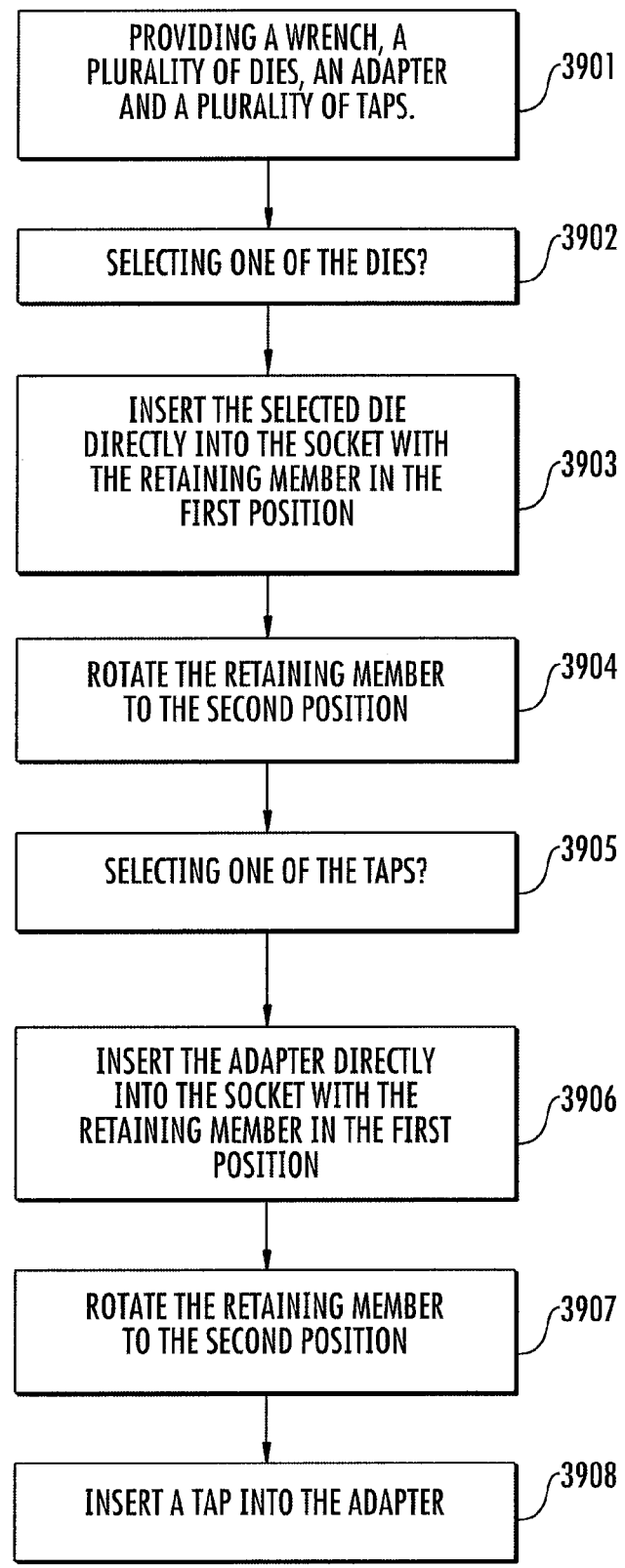
FIG. 39 is a block diagram illustrating a method of using the threading system of the invention.

The tap adapters 202, 203 are identical except that the tap retaining portion of adapter 202 is larger than adapter 203 for holding larger size taps such that reference will be made to adapter 202 as shown in FIGS. 29 and 30. Adapter 202 includes a body portion 270 that supports a tap retaining portion 273 that includes a plurality of teeth 272 that cooperate to releasably grip the square connector 206a of tap 206. The teeth are biased away from one another, such as by a spring 283, to release the taps. The teeth 272 are forced toward one another by a sleeve 274 that is movable from a release position to a lock position. In the illustrated embodiment sleeve 274 is threaded onto body 270. In the locked position cam surfaces 274a of the sleeve 274 engage the teeth 272 to force the teeth toward one another and into locking engagement with the tap when the sleeve is threaded onto the body 270. The sleeve may be threaded out from body 270 from the locked position to the release position where teeth 272 are biased away from one another by spring 283. While one embodiment of the tap engaging portion is shown and described, the tap engaging portion of adapters 202, 203 may take various configurations to releasably hold a tap.

The end of body portion 270 opposite the tap engaging portion is formed with a turning tool engaging portion 271 that can be engaged by one of a variety of turning tools. The turning tool engaging portion 271 includes a first connector 280 rigidly secured to body portion 270. The body portion 270 and connector 280 may be made as one-piece. The connector 280 has a shape and dimensions that are substantially the same as the shape and dimensions of die 204 such that the connector 280 fits into the socket in the same manner as the die. Die 204, as is known, typically has a hexagonal shape where six faces 216 form the outer periphery of the die having chamfered edges 255. The top and bottom surfaces of the die are generally flat such that the die has a generally disk shape. The first connector 280 is similarly shaped having a hexagonal peripheral outer surface formed of six sides 218 and chamfered edges 281. The top surface 219 of the connector is generally flat and the bottom surface of the connector is fixed to the body 270. The first connector 280 has the same shape and dimensions as the die such that the adapter can be inserted into the socket 234 in the same manner as a die 204. The body 270 has a smaller cross-sectional dimension than the connector 280 such that a peripheral shoulder 283 having chamfers 281 is formed about the periphery of the connector 280. The chamfered shoulder is engaged by the locking ring 210 in the same manner as the chamfered surface of die 204 to lock the adapter 202 into the socket 234 of wrench 201. Because the peripheral outer surface of the connector 280 is closely received by the faces 232 of the socket 234, rotation of the wrench 201 causes simultaneous rotation of the adapter 202.

The turning tool engaging portion 271 of the adapter 202 is formed with a second connector for connecting to the drive 207a of a standard ratchet wrench 207. Typically, the drive 207a of a standard ratchet wrench is a square drive such that the second connector comprises a mating square recess 275 formed in the turning tool engaging portion 271 and extending along the axis of rotation of the adapter. Square drive 207a can be inserted into mating square recess 275. Where the drive 207a has other than a square shape the recess 275 will have a similar mating shape.

The tool engaging portion 271 is formed with a third connector comprising a bore 277 formed transverse to the rotational axis of the adapter 202. An adapter bar 208 fits into the bore 277 to create a handle for applying a turning force to the adapter 202. The bore 277 may extend through the tap adapter 202 such that the adapter bar 208 can extend completely through the adapter. In the illustrated embodiment the bore 277 passes through the square recess 275. A spring loaded button 279 is provided that extends transverse to bore 277 to engage bar 208 and lock the bar in position in the bore 277. The bar 208 may include a mating recess for receiving the button 279.

In operation the system of the invention provides the ability to use a single wrench 201 with both taps and dies. To rotate a die 204, the die 204 is inserted directly into the socket 234 of wrench 201 and is locked in place by rotating the locking ring 210 as previously described. To rotate a tap, the connector 280 of the adapter 202, 203 is inserted directly into the socket 234 of wrench 201 and is locked in place by rotating the locking ring 210 in the same manner as with the die. A tap 206 is inserted into the adapter 202, 203. In use of the system of the invention the adapter 202, 203 may also be engaged by the adapter bar 208 or a ratchet wrench rather than the wrench 201.

Figure 28:
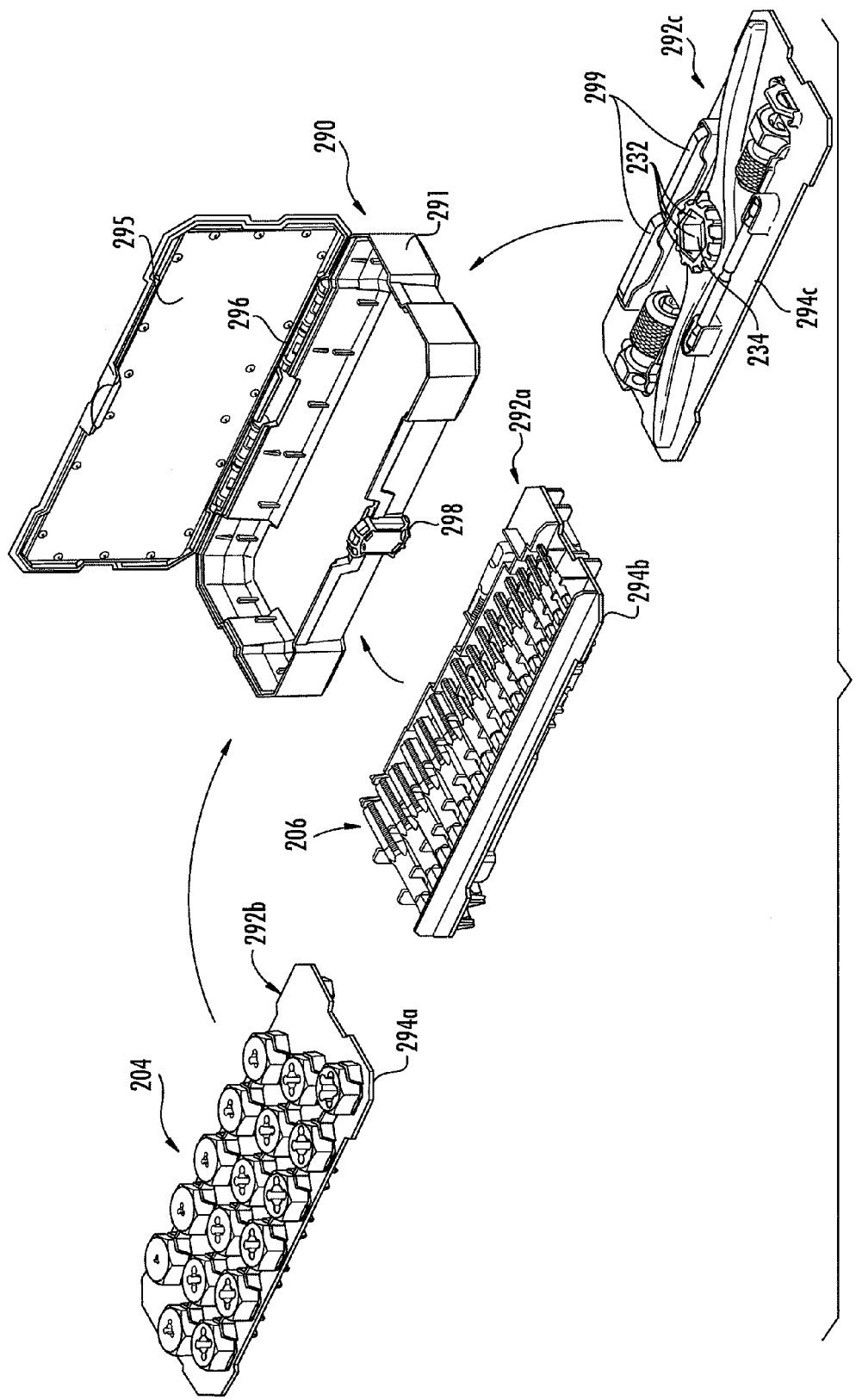
FIG. 28 is a perspective view of a set of the flexible threading system of claim 27.

Referring to FIG. 28, the wrench, adapters, adapter bar, taps and dies may be sold in a kit where the components of the system are retained in a case 290. The case 290 may comprise a housing 291 for receiving a plurality of modular sets where a first set 292a holds a variety of taps, a second set 292b holds a variety of dies and a third set 292c holds the wrench 201, tap bar 208 and tap adapters 202, 203. The sets 292a, 292b and 292c may be retained on trays or inserts 294a, 294b and 294c, respectively, that fit inside the same housing 291. A cover 295 may be pivoted to the housing 291 at hinge 296 and a lock 298 may be provided for locking the cover 295 in the closed position. The cover 295 may be transparent. The sets may include a first plurality of taps such as metric taps and a second plurality of taps such as SAE taps, a first plurality of dies such as metric dies and a second plurality of dies such as SAE dies, other related tools such as pilot drill bits, extractors, pitch gauges 299 or the like. By providing the taps, dies and wrenches as separate modular sets, the system can also be marketed as a flexible threading solution where different sets of the taps, dies and other tools may be sold and purchased separately.

In use a flexible threading system is provided comprising a wrench 201, a plurality of dies 204, an adapter 202, 203, and a plurality of taps 206, block 3901. If one of the plurality of dies is selected, block 3902, the selected die is inserted directly into the socket 234 with the retaining member 210 in the first position, block 3903. The retaining member 210 is rotated to the second position to lock the die in the wrench, block 3904. If one of the plurality of taps is selected, block 3905, the adapter 202, 203 is inserted into the socket with the retaining member in the first position, block 3906. The retaining member 210 is rotated to the second position to lock the adapter in the wrench, block 3907. One of the plurality of taps is inserted into the adapter, block 3908.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A threading system comprising:
a wrench including a body defining a socket comprising a first plurality of faces, a handle connected to the body for rotating the body, and a retaining member rotatably mounted to said body for movement between a first position and a second position, said retaining member exposing said socket when in said first position and having a portion extending over said socket when in said second position, said retaining member having a second plurality of faces defining an opening, said second plurality of faces being coextensive with the first plurality of faces when the retaining member is in the first position;
a first threading tool having a shape and a dimension to fit into said socket; and
an adapter for retaining a second threading tool comprising a first connector having substantially the same shape and the dimension as the first threading tool.

2. The system of claim 1 further comprising a second handle secured to said body.

3. The system of claim 1 wherein said first connector includes a first peripheral wall, said first peripheral wall being closely received by said first plurality of faces.

4. The system of claim 3 wherein said first threading tool includes a second peripheral wall, said second peripheral wall being closely received by said first plurality of faces.

5. The system of claim 1 wherein said retaining member rotates relative to said body between said first position and said second position.

6. The system of claim 1 wherein said adapter includes a tap engaging portion for releasably retaining a tap.

7. The system of claim 6 wherein said adapter includes a plurality of teeth that are moved into engagement with said tap.

8. The system of claim 7 wherein the teeth are biased away from one another.

9. The system of claim 7 wherein the teeth are forced toward one another by a sleeve that is movable from a release position to a locked position.

10. The system of claim 6 wherein said adapter can retain a plurality of different taps.

11. The system of claim 10 wherein the tap engaging portion and the first connector are one-piece.

12. The system of claim 6 wherein the first connector has substantially the same shape and dimension as the tap.

13. The system of claim 12 wherein the first connector is hexagonal.

14. The system of claim 1 wherein the adapter is dimensioned to be inserted through the retaining member and into the socket.

15. The system of claim 1 wherein when the retaining member is rotated relative to the body, the second plurality of faces of the retaining member are offset from the first plurality of faces of the socket.

16. The system of claim 1 the adapter further including a second connector for connecting to the drive of a standard ratchet wrench.

17. The system of claim 16 wherein the second connector comprises a recess formed along a rotational axis of the adapter.

18. The system of claim 16 the adapter further including a third connector comprising a bore formed transverse to a rotational axis of the adapter.

19. The system of claim 1 further comprising a case for receiving a plurality of inserts each comprising a modular set where one set comprises a plurality of taps, a second set comprises a plurality of dies and a third set comprises the wrench.

20. The system of claim 1 wherein a front face of the first threading tool and an outer surface of the retaining ring are coplanar.

21. A flexible threading method comprising:
providing a wrench having a body having a socket defined by a first plurality of flat faces, a handle connected to the body for rotating the body, and a retaining member rotatably mounted to said body for movement between a first position and a second position, said retaining member exposing said socket when in said first position and having a portion extending over said socket when in said second position, said retaining member having a second plurality of faces defining an opening, said second plurality of faces being coextensive with the first plurality of faces when the retaining member is in the first position;
a plurality of dies each having a shape and a dimension to fit into said socket; an adapter for retaining one of a plurality of taps and having a connector having the shape and the dimension to fit into said pocket;
selecting one of the plurality of dies or one of the plurality of taps;
if one of the plurality of dies is selected, inserting said one of said plurality of dies into said socket when said retaining member is in the first position, and rotating the retaining member to said second position;
if one of the plurality of taps is selected, inserting said connector into said socket when said retaining member is in the first position, and rotating the retaining member to said second position; and
inserting said one of the plurality of taps into said adapter.

22. A method of providing a flexible threading system comprising:
providing a wrench having a body having a socket defined by a first plurality of flat faces, a handle connected to the body for rotating the body, and a retaining member rotatably mounted to said body for movement between a first position and a second position, said retaining member exposing said socket when in said first position and having a portion extending over said socket when in said second position, said retaining member having a second plurality of faces defining an opening, said second plurality of faces being coextensive with the first plurality of faces when the retaining member is in the first position;
providing a first set of a plurality of dies each having a shape and a dimension to fit into said socket;
providing a second set of a plurality of taps;
providing an adapter for retaining one of said plurality of taps and having a connector having the shape and the dimension to fit into said pocket.

23. The method of claim 22 further providing a third set of a second plurality of dies each having a shape and a dimension to fit into said socket.

24. The method of claim 22 further providing a fourth set of a second plurality of taps.

25. The method of claim 22 further providing a second tool for engaging and turning said adapter.

26. An adapter comprising:
a first connector having a hexagonal shape connected to a body portion where the body portion has a smaller cross-sectional dimension than the first connector such that a shoulder is formed between the body portion and the first connector, said first connector being adapted to fit into a socket of a socket wrench such that the shoulder may be engaged by a retaining member;
a tool engaging portion on the body portion for releasably retaining a tool including a plurality of teeth that are movable into engagement with said tool;
a second connector for connecting to the drive of a standard ratchet wrench comprising a recess formed along a rotational axis of the adapter; and
a third connector comprising a bore formed transverse to the rotational axis of the adapter.

27. The adapter of claim 26 wherein the teeth are biased away from one another.

28. The adapter of claim 26 wherein the teeth are forced toward one another by a sleeve that is movable from a release position to a locked position.

29. The adapter of claim 26 wherein said shoulder is chamfered.

30. The adapter of claim 26 wherein the recess is square.

* * * * *